US011190445B2

(12) United States Patent
Bosch et al.

(10) Patent No.: US 11,190,445 B2
(45) Date of Patent: *Nov. 30, 2021

(54) SYSTEM AND METHOD TO FACILITATE CONTENT DELIVERY TO MULTIPLE RECIPIENTS IN A NETWORK ENVIRONMENT

(71) Applicant: Cisco Technology, Inc., San Jose, CA (US)

(72) Inventors: Hendrikus G. P. Bosch, Aalsmeer (NL); Sape Jurriën Mullender, Amsterdam (NL); Keith Burns, San Jose, CA (US); Jeffrey Napper, Delft (NL); William Mark Townsley, Paris (FR); Alessandro Duminuco, Milan (IT); Andre Surcouf, Saint Leu la Foret (FR); Ijsbrand Wijnands, Leuven (BE); Humberto J. La Roche, Ocean, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,549

(22) Filed: Aug. 5, 2019

(65) Prior Publication Data

US 2019/0356590 A1  Nov. 21, 2019

Related U.S. Application Data

(63) Continuation of application No. 15/436,540, filed on Feb. 17, 2017, now Pat. No. 10,469,379.

(51) Int. Cl.
*H04L 12/749* (2013.01)
*H04L 12/717* (2013.01)
(Continued)

(52) U.S. Cl.
CPC ............ *H04L 45/741* (2013.01); *H04L 45/16* (2013.01); *H04L 45/42* (2013.01);
(Continued)

(58) Field of Classification Search
CPC ....... H04L 45/741; H04L 45/16; H04L 45/42; H04L 65/4076; H04L 65/4084;
(Continued)

(56) References Cited

U.S. PATENT DOCUMENTS 5,469,562 A * 11/1995 Saether ............... G06F 11/1474
711/100
6,415,031 B1 * 7/2002 Colligan ............. H04N 7/1675
348/E7.056
(Continued)

FOREIGN PATENT DOCUMENTS

| CN | 104137509 A | 11/2014 |
|---|---|---|
| EP | 2557817 | 2/2013 |

(Continued)

OTHER PUBLICATIONS

Explicit Multicast (Xcast) Concepts and Options, R. Boivie, Ie If, Nov. 30, 2007.*

(Continued)

*Primary Examiner* — Duc C Ho

(57) ABSTRACT

A method is provided in one example embodiment and may include determining at a parent content node that a plurality of recipient content nodes are to receive a same content; generating, based on a determination that the same content is available at the parent content node, a multi-delivery header comprising a plurality of identifiers, wherein each identifier of the plurality of identifiers indicates each recipient content node that is to receive the same content; appending the multi-delivery header to one or more packets of an Internet Protocol (IP) flow associated with the same content;
(Continued)

and transmitting packets for the IP flow to each of the plurality of the recipient content nodes.

20 Claims, 13 Drawing Sheets

(51) Int. Cl.
  *H04L 29/06* (2006.01)
  *H04L 12/761* (2013.01)
  *H04L 29/08* (2006.01)
  *H04L 29/12* (2006.01)
(52) U.S. Cl.
  CPC ...... *H04L 65/4076* (2013.01); *H04L 65/4084* (2013.01); *H04L 67/327* (2013.01); *H04L 69/22* (2013.01); *H04L 61/6059* (2013.01); *H04L 69/164* (2013.01)
(58) Field of Classification Search
  CPC ... H04L 67/327; H04L 69/22; H04L 61/6059; H04L 69/164
  See application file for complete search history.

(56) References Cited

U.S. PATENT DOCUMENTS

| | | | |
|---|---|---|---|
| 7,400,645 B2 | 7/2008 | Tsuchiya et al. | |
| 8,694,675 B2 | 4/2014 | Wang et al. | |
| 9,276,840 B2 | 3/2016 | Scott et al. | |
| 9,282,050 B2 | 3/2016 | Mosko | |
| 9,391,896 B2 | 7/2016 | Mosko | |
| 9,451,032 B2 | 9/2016 | Scott et al. | |
| 9,516,144 B2 | 12/2016 | Mosko et al. | |
| 10,135,756 B2 | 11/2018 | Pfister et al. | |
| 10,158,558 B1 | 12/2018 | Ward et al. | |
| 2002/0002564 A1* | 1/2002 | Munetsugu | H04N 21/26216 715/204 |
| 2003/0060240 A1* | 3/2003 | Graham | H04M 1/72439 455/566 |
| 2004/0205247 A1 | 10/2004 | Ahn | |
| 2007/0263864 A1* | 11/2007 | Buchen | H04N 7/1675 380/201 |
| 2008/0172478 A1* | 7/2008 | Kiyohara | H04L 45/02 709/220 |
| 2008/0298458 A1* | 12/2008 | Yang | H03M 7/30 375/240 |
| 2009/0080352 A1* | 3/2009 | Yoneda | H04L 12/189 370/312 |
| 2010/0195655 A1 | 8/2010 | Jacobson et al. | |
| 2011/0286470 A1 | 11/2011 | Dec et al. | |
| 2012/0113986 A1* | 5/2012 | Shaffer | H04L 1/1854 370/390 |
| 2013/0332619 A1 | 12/2013 | Xie et al. | |
| 2014/0053228 A1* | 2/2014 | Mahadevan | G06F 16/176 726/1 |
| 2015/0078377 A1 | 3/2015 | Wijnands et al. | |
| 2015/0109902 A1* | 4/2015 | Kumar | H04L 41/0668 370/219 |
| 2015/0113166 A1 | 4/2015 | Mosko | |
| 2015/0131659 A1 | 5/2015 | Wijnands et al. | |
| 2016/0119159 A1 | 4/2016 | Zhao et al. | |
| 2016/0134535 A1 | 5/2016 | Callon | |
| 2016/0182368 A1 | 6/2016 | Azgin et al. | |
| 2016/0205178 A1* | 7/2016 | Mosko | H04L 67/1063 709/204 |
| 2016/0277201 A1 | 9/2016 | Thubert et al. | |
| 2017/0134276 A1* | 5/2017 | White | H04L 45/742 |
| 2017/0237660 A1 | 8/2017 | Trossen et al. | |
| 2017/0244667 A1* | 8/2017 | Maslak | H04L 61/1511 |
| 2017/0302576 A1 | 10/2017 | Townsley et al. | |
| 2018/0227230 A1 | 8/2018 | Azgin et al. | |
| 2018/0278522 A1 | 9/2018 | Asati et al. | |
| 2019/0149449 A1* | 5/2019 | Morris | H04L 45/22 709/238 |
| 2019/0199540 A1 | 6/2019 | Robitzsch et al. | |

FOREIGN PATENT DOCUMENTS

| | | | |
|---|---|---|---|
| WO | 201 3130320 | A1 | 9/2013 |
| WO | 2016093749 | A1 | 6/2016 |

OTHER PUBLICATIONS

Boivie, R., et al., "Explicit Multicast (Xcast) Concepts and Options," Network Working Group RFC 5058, Nov. 2007; 35 pages.
Deering, S., et al., "Internet Protocol, Version 6 (IPv6) Specification," Network Working Group RFC 2460, Dec. 1998; 39 pages.
Previdi, S., et al., "IPv6 Segment Routing Header (SRH)," draft-ietf-6man-segment-routing-header-02, Network Working Group Internet Draft, Sep. 20, 2016; 29 pages.
Wignands, IJ, et al., "Multicast using Bit Index Explicit Replication," draft-ietf-bier-architecture-05, Internet Engineering Task Force Internet Draft, Oct. 28, 2016; 36 pages.
International Search Report and Written Opinion in corresponding International Application No. PCT/US2018/017552, dated Apr. 17, 2018, 11 pages.
Tae Won Cho, et al., "Enabling Content Dissemination Using Efficient and Scalable Multicast", INFOCOM 2009, IEEE, Apr. 19-25, 2019, 9 pages.
János Tapolcai, et al., "Optimal False-Positive-Free Bloom Filter Design for Scalable Multicast Forwarding", IEEE/ACM Transactions on Networking, vol. 23, No. 6, Dec. 2015, 14 pages.
D. Perino, et al., "A Reality Check for Content Centric Networking", ICN'11, Aug. 19, 2011, Toronto, Ontario, Canada, 6 pages.
V. Jacobson, et al., "Networking Named Content", CoNEXT 2009, Dec. 2009, Rome, Italy, 13 pages.
D. Allan, et al., "A Framework for Computed Multicast applied to MPLS based Segment Routing", draft-allan-spring-mpls-multicast-framework-02, SPRING Working Group, Internet Draft, Sep. 2016, 14 pages.
M. Bishop, Ed., "Hypertext Transfer Protocol (HTTP) over QUIC", draft-ietf-quic-http-01, QUIC, Internet-Draft, Jan. 14, 2017, 25 pages.
C. Filsfils, ed., et al., "Segment Routing Architecture", draft-ietf-spring-segment-routing-10, Network Working Group, Internet-Draft, Nov. 19, 2016, 29 pages.
P. Pfister, et al., "An IPv6 based BIER Encapsulation and Encoding", draft-pfister-bier-over-ipv6-01, Network Working Group, Internet-Draft, Oct. 31, 2016, 6 pages.
Wikipedia page, "Forwarding information base", https://en.wikipedia.org/wiki/Forwarding_information_base, downloaded from the internet on Feb. 1, 2017, 5 pages.
Wikipedia page, "HTTP Live Streaming", https://en.wikipedia.org/wiki/HTTP_Live_Streaming, downloaded from the internet on Jan. 30, 2017, 16 pages.
Wikipedia page, "IPv6", https://en.wikipedia.org/wiki/IPv6, downloaded from the internet on Jan. 24, 2017, 17 pages.
Iraj Sodagar, "MPEG Dynamic Adaptive Streaming over HTTP (DASH)", MPEG doc# N11964, Mar. 2011, http://mpeg.chiariglione.org/standards/mpeg-dash/media-presentation-description-and-segment-formats, downloaded from the internet on Jan. 30, 2017, 11 pages.
Wikipedia page, "QUIC", https://en.wikipedia.org/wiki/QUIC, downloaded from the internet on Jan. 24, 2017, 4 pages.
Wikipedia page, "Routing table", https://en.wikipedia.org/wiki/Routing_table, downloaded from the internet on Feb. 1, 2017, 4 pages.
Daniel Dib, "Segment Routing: Potential for Far-Reaching Network Effects", Network Computing, http://www.networkcomputing.com/networking/segment-routing-potential-far-reaching-network-effects/516090694, Jun. 9, 2015, 14 pages.
Techopedia Definition, "What is a 5-Tuple?", https://www.techopedia.com/definition/28190/5-tuple, downloaded from the internet on Jan. 26, 2017, 2 pages.

(56) References Cited

OTHER PUBLICATIONS

C. Tsilopoulos, et al., "Reducing Forwarding State in Content-Centric Networks with Semi-Stateless Forwarding", Published in Proceedings of the IEEE InfoCom 2014, IEEE Conference on Computer Communications, Apr. 27-May 2, 2014, Toronto, ON, Canada, 10 pages.

Van Jacobson, "Introduction to Content Centric Networking", FISS 09, Bremen, Germany, Jun. 22, 2009, 96 pages.

C. Ghali, et al., "Living in a PIT-LESS World: A Case Against Stateful Forwarding in Content-Centric Networking", https://arxiv.org/abs/1512.07755, Dec. 24, 2015, 10 pages.

M. Gallo, et al., "Content-Centric Networking Packet Header Format", draft-ccn-packet-header-00, Internet Engineering Task Force, Internet-Draft, Jan. 26, 2015, 16 pages.

IJ. Wijnands, Ed., "Encapsulation for Bit Index Explicit Replication in MPLS and non-MPLS Networks", draft-ietf-bier-mpls-encapsulation-06, Internet Engineering Task Force, Internet-Draft, Dec. 9, 2016, 20 pages.

IJ. Wijnands, Ed., et al., "Multicast using Bit Index Explicit Replication", draft-wijnands-bier-architecture-00, Internet Engineering Task Force, Internet-Draft, Sep. 22, 2014, 24 pages.

"Interest Packet", NDN Packet Format Specification 0.2-2 documentation, https://named-data.net/doc/ndn-tlv/interest.html, downloaded from the internet on Mar. 1, 2017, 5 pages.

"Data Packet", NDN Packet Format Specification 0.2-2 documentation, https://named-data.net/doc/ndn-tlv/data.html, downloaded from the internet on Mar. 1, 2017, 3 pages.

E. Rosen, et al., "MPLS Label Stack Encoding", Network Working Group, Jan. 2001, RFC 3032, 23 pages.

A. Adams, et al., "Protocol Independent Multicast-Dense Mode (PIM-DM): Protocol Specification (Revised)", Network Working Group, Jan. 2005, RFC 3973, 61 pages.

B. Fenner, et al., "Protocol Independent Multicast-Sparse Mode (PIM-SM): Protocol Specification (Revised)", Network Working Group, Aug. 2006, RFC 4601, 112 pages.

T. Eckert, et al., "Traffic Engineering for Bit Index Explicit Replication BIER-TE", draft-eckert-bier-te-arch-02, Network Working Group, Internet-Draft, Oct. 18, 2015, 30 pages.

X. Xu, et al., "BIER Encapsulation", draft-xu-bier-encapsulation-03, Network Working Group, Internet-Draft, Oct. 13, 2015, 6 pages.

A. Detti, et al., "IP protocol suite extensions to support CONET Information Centric Networking", draft-detti-conet-ip-option-05, Network Working Group, Internet-Draft, Jun. 20, 2013, 21 pages.

IJ. Wijnands, Ed., et al., "Encapsulation for Bit Index Replication in MPLS Networks", draft-ietf-bier-mpls-encapsulation-02, Internet Engineering Task Force, Internet-Draft, Aug. 31, 2015, 15 pages.

J. Hong, et al., "Bloom Filter-based Flat Name Resolution System for ICN", draft-hong-icnrg-bloomfilterbased-name-resolution-05.txt, ICNRG, Internet Draft, Oct. 19, 2015, 22 pages.

A. Detti, et al., "CONET: A Content Centric Inter-Networking Architecture", ICN'11, Aug. 19, 2011, Toronto, Ontario, Canada, 6 pages.

N. Kumar, et al., "BIER Use Cases", draft-ietf-bier-use-cases-04.txt, Network Working Group, Internet-Draft, Jan. 8, 2017, 17 pages.

A. Rahman, et al., "Deployment Configurations for Information-Centric Networks (ICN)", draft-rahman-icnrg-deployment-guidelines-00, ICNRG, Internet-Draft, Mar. 11, 2017, 17 pages.

Thaler, D., "Multipath issues in Unicast and Multicast Next-Hop Selection," Network Working Group, RFC 2992, Nov. 2000, 9 pages.

Trotter, G., "Terminology for Forwarding Information Base (FIB) based Router Performance," Network Working Group 3222, Dec. 2001, 15 pages.

English Translation of Office Action in corresponding Chinese Application No. 201880012207.7, dated Mar. 29, 2021, 9 pages.

* cited by examiner

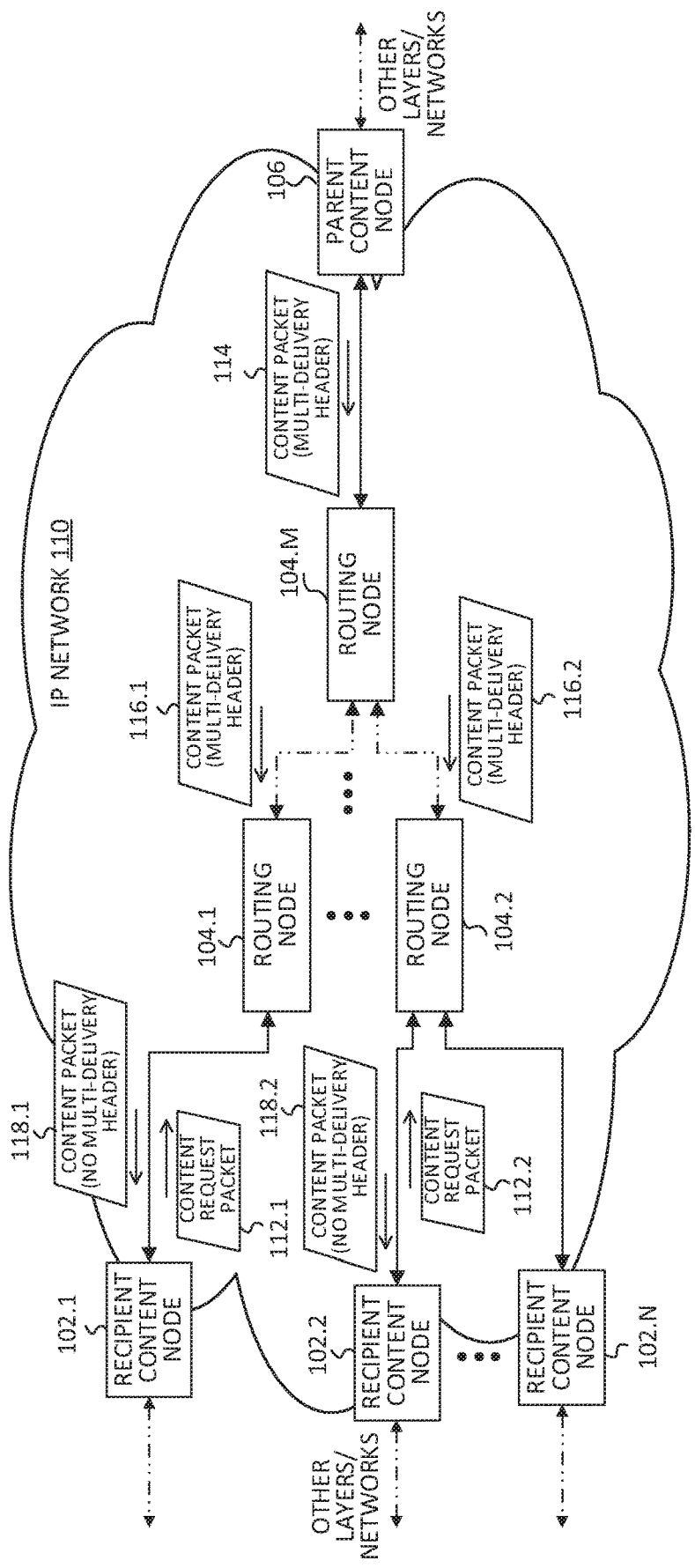

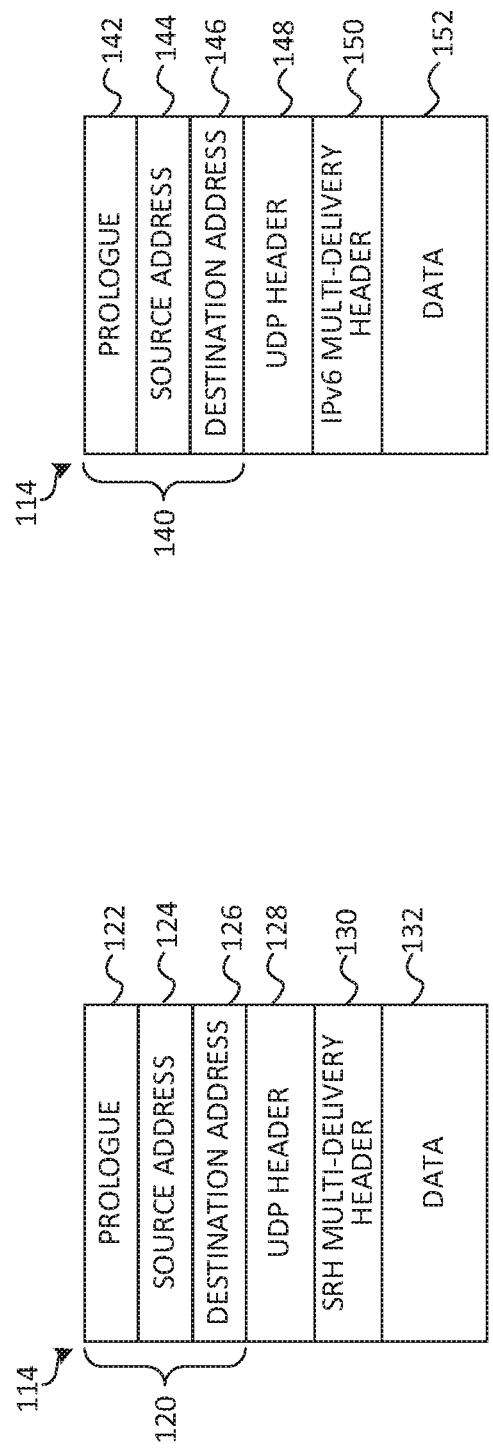

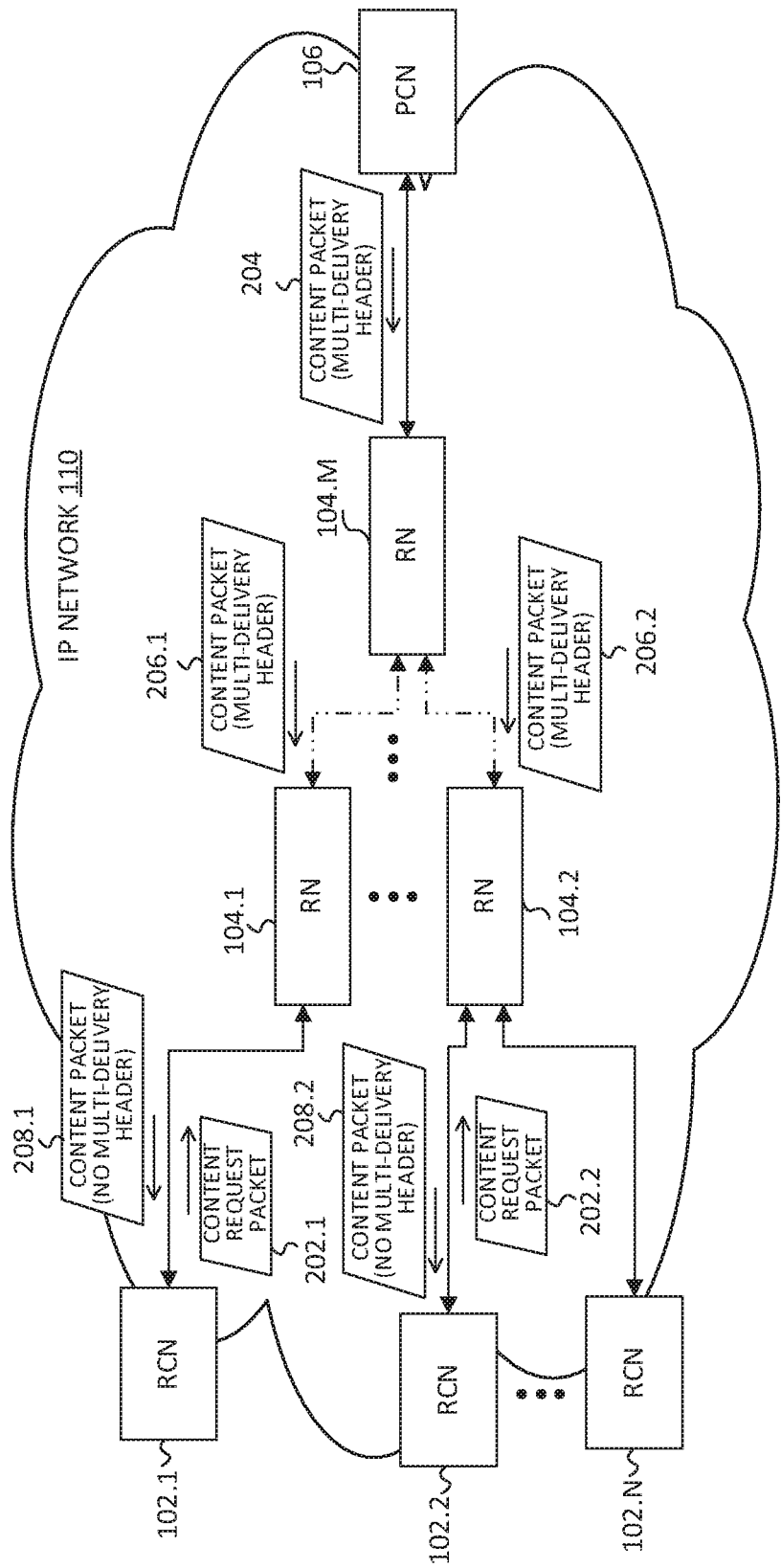

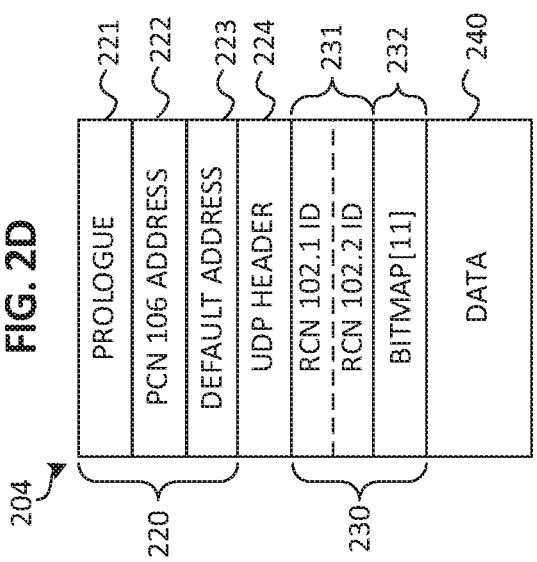
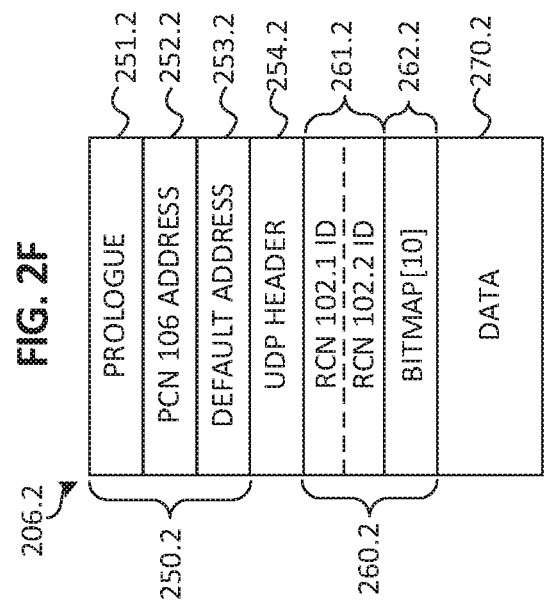
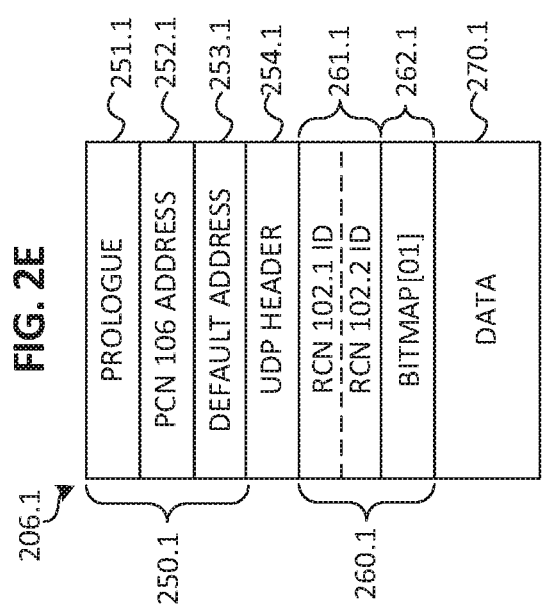

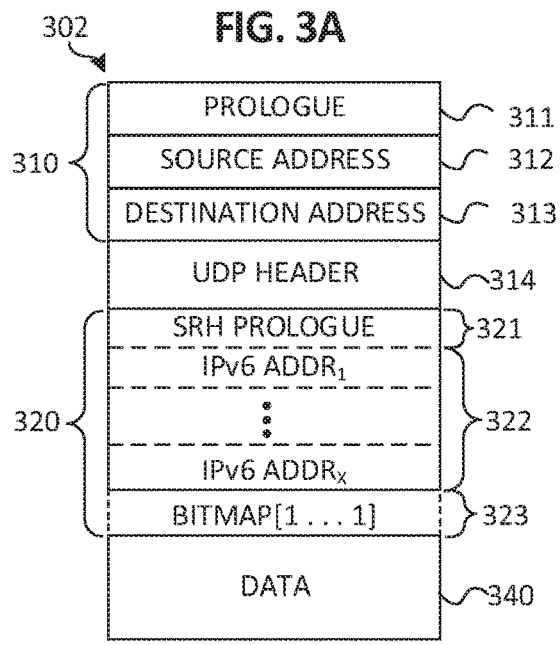
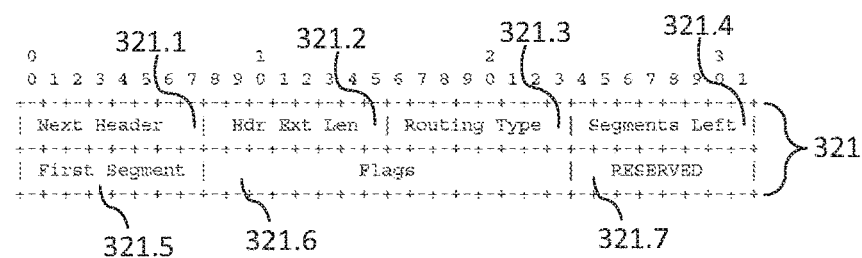
FIG. 3A
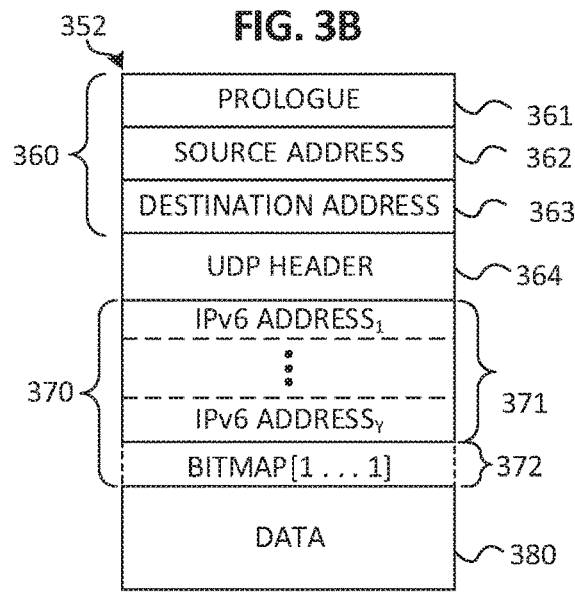
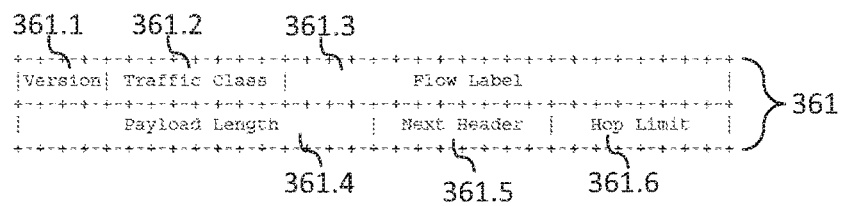
FIG. 3B

SYSTEM AND METHOD TO FACILITATE CONTENT DELIVERY TO MULTIPLE RECIPIENTS IN A NETWORK ENVIRONMENT

CROSS-REFERENCE TO RELATED APPLICATION

This application is a continuation of and claims benefit to U.S. patent application Ser. No. 15/436,540, filed Feb. 17, 2017, the entire contents of which are incorporated herein by reference.

TECHNICAL FIELD

This disclosure relates in general to the field of computer networking, and more particularly, to a system and method to facilitate content delivery to multiple recipients in a network environment.

BACKGROUND

Information-Centric Networking (ICN) represents a broad research direction for moving the Internet toward a content/information/data centric network architecture. At least some future network architecture possibilities for ICN are based on empirical research related to network usage and the desire to overcome problems with existing architectures such as Internet Protocol (IP). ICN and its specific architecture designs, such as Named Data Networking (NDN) and Content Centric Networking (CCN), offer a fundamentally different approach in supporting information dissemination over any type of network. CCN and NDN represent content-based (or data-oriented) networking architectures rather than a host-oriented networking architecture. However, deployment of ICN architectures can involve consideration of existing IP network architectures, which presents a significant challenge to traffic engineers and administrators alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1A is a simplified block diagram illustrating example details associated with a communication system that can facilitate content delivery to multiple recipients in a network environment according to one embodiment of the present disclosure;

FIGS. 1B-1C are simplified schematic diagrams illustrating example details that can be associated with different content packet configurations in accordance with various embodiments of the communication system;

FIG. 2A is a simplified block diagram illustrating other example details that can be associated with the communication system for an example use case in accordance with one potential embodiment;

FIGS. 2B-2H are simplified schematic diagrams illustrating example details for various packets that can be associated with the example use case of FIG. 2A;

FIGS. 3A-3B are simplified schematic diagrams illustrating example details for various content packets that can be associated with various embodiments of the communication system;

FIG. 4 is a simplified flow diagram illustrating example details that can be associated with example operations that can facilitate content delivery to multiple recipients in a network environment in accordance with one potential embodiment of the communication system;

DETAILED DESCRIPTION OF EXAMPLE EMBODIMENTS

Overview

Figure 2C:
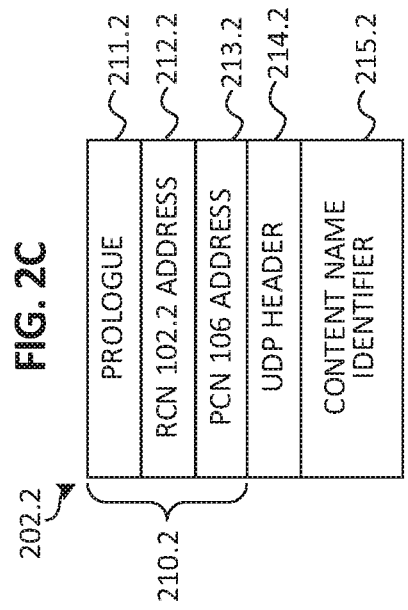

A method is provided in one example embodiment and can include determining at a parent content node that a plurality of recipient content nodes are to receive a same content; generating, based on a determination that the same content is available at the parent content node, a multi-delivery header comprising a plurality of identifiers, wherein each identifier of the plurality of identifiers indicates each recipient content node that is to receive the same content; appending the multi-delivery header to one or more packets of an Internet Protocol (IP) flow associated with the same content; and transmitting packets for the IP flow to each of the plurality of the recipient content nodes. The plurality of identifiers included in the multi-delivery header can include a plurality of Internet Protocol version 6 (IPv6) addresses, wherein each IPv6 address corresponds to a particular recipient content node of the plurality of recipient content nodes; and (optionally) a plurality of User Datagram Protocol (UDP) port values, wherein each UDP port value corresponds to a particular recipient content node of the plurality of recipient content nodes. In some instances the multi-delivery header can further include a bitmap wherein each bit in the bitmap corresponds to a particular recipient content node of the plurality of recipient content nodes.

The method can further include receiving, at a routing node, at least one packet for the IP flow that is appended with the multi-delivery header; and determining whether the at least one packet is to be routed directly to a particular recipient content node of the plurality of recipient content nodes or to at least one other routing node. In some instances, the method can include forwarding the at least one packet including the multi-delivery header to at least one other routing node. In some instances, the method can include removing the multi-delivery header based on a determination that the at least one packet is to be routed to the particular recipient content node of the plurality of recipient content nodes; replacing a destination address for the at least one packet to correspond to an address of the particular recipient content node; and forwarding the at least one packet to the particular recipient content node. In still some instances, the method can include determining whether the multi-delivery header is to be cached at the routing node; and caching the multi-delivery header and an association for any forwarding associated with the at least one packet for use with subsequent packets of the IP flow based on a determination that the multi-delivery header is to be cached at the routing node.

In still some instances, the method can include determining that the multi-delivery header includes a bitmap including a number of bits associated with each identifier of the plurality of identifiers included in the multi-delivery header. In still some instances, the method can include determining, using the bitmap and each identifier of the plurality of identifiers included in the multi-delivery header, that the at least one packet is to be forwarded to a plurality of other routing nodes. In still some instances, the method can include replicating the at least one packet based on a determination that the at least one packet is to be routed to a plurality of other routing nodes to generate a plurality of replicated packets; resetting, for a respective bitmap for each respective multi-delivery header, one or more bits based on a particular routing node to which each replicated packet is to be forwarded; and forwarding each replicated packet to each particular other routing node of the plurality of other routing nodes.

Example Embodiments

Referring to FIG. 1A, FIG. 1A is a simplified block diagram illustrating example details associated with a communication system 100 that can facilitate content delivery to multiple recipients in a network environment according to one embodiment of the present disclosure. FIGS. 1B-1C are simplified schematic diagrams illustrating example details that can be associated with different content packet configurations in accordance with various potential embodiments of the communication system 100 of FIG. 1A. FIG. 1A includes multiple recipient content nodes (RCNs) 102.1-102.N, multiple routing nodes (RNs) 104.1-104.M and a parent content node (PCN) 106, each of which can communicate over an Internet Protocol (IP) network 110.

Recipient content node 102.1 can directly interface with routing node 104.1. Recipient content nodes 102.2 and 102.N can directly interface with routing node 104.2. Routing node 104.1 and routing node 104.2 can interface with routing node 104.M, potentially though one or more other routing nodes. Routing node 104.M can interface directly with parent content node 106. In at least one embodiment, the interconnection of recipient content nodes 102.1-102.N with parent content node 106 via routing nodes 104.1-104.M can represent a layer of an Information-Centric Networking (ICN) network that can be implemented for communication system 100. Other recipient content nodes, parent content nodes and/or routing nodes can be deployed for communication system 100; thus, providing for the ability to create a hierarchy of interconnected ICN layers for one or more networks. As illustrated for the embodiment of FIG. 1A, recipient content nodes 102.1-102.N and parent content node 106 can interface with other layers and/or networks.

For purposes of illustrating certain example techniques of multiple recipient content delivery embodiments in communication system 100, it is important to understand the communications that may be traversing the network and protocols used in effecting such communications. The following foundational information may be viewed as a basis from which the present disclosure may be properly explained. Such information is offered earnestly and for teaching purposes only and, therefore, should not be construed in a way to limit the broad applications and teachings of the present disclosure.

Information-Centric Networking (ICN) offers a fundamentally different approach for information dissemination in a network environment. This approach involves a content/information/data centric network architecture. CCN, NDN and variations thereof (e.g., CCNx® as developed by the Palo Alto Research Center (PARC)) are examples of ICN architectures, each of which can be used as the underlying architecture for implementing multiple recipient content delivery embodiments described herein. CCN, CCNx and NDN are based on a premise that the flow of messages through a network is based on the name of the content of the messages.

Communication in an ICN network is typically driven by consumers that initiate requests for information through the exchange of messages. In NDN and CCN protocols, there are two basic messages, an interest message, which requests a piece of content via a hierarchical tokenized name, and a content message, which returns the requested named piece of content. In a typical ICN network, names are the only identifiers in the protocols; neither source addresses nor destination addresses are employed.

A namespace allows content to be referenced by name in interest and data packets. The namespace is hierarchical and carries semantic information. An ICN name is a hierarchical name for content and contains a sequence of name components. For example, /com/youtube/<mediaID>/audio/<frameID>/<segment #> contains six name components with each one delineated by a slash. For a content item to be globally accessible, the content item is assigned a globally unique name. When a client (also referred to herein as 'consumer' or 'recipient') wants particular content, the client can generate an interest packet that includes the name of the desired content. In at least some instances, the name of the requested content may be provided by a user or process that intends to consume the content. A content node receiving an interest packet can perform Longest Prefix Matching (LPM) to determine whether the content is stored at the node or whether the interest needs to be forwarded to another content node. The interest packet can be forwarded along one or more path(s) for any interface(s) associated with a LPM of the content name.

NDN and CCN routers use the name to forward the interest packet toward the desired content. The desired content may be found at the source (also referred to herein as 'producer' or 'parent') that produced the content or at other nodes along a path to the source. A node between the source and the client may have stored the content if the content passed through the node one or more times. When an interest packet reaches a node that contains the desired content (e.g., either a producer node or another node along a path to the producer node), the node can generate a content packet that includes the name and the content. In addition, the content packet may also be signed with the content publisher's key. To reach the consumer, the content packet follows the reverse path taken by the interest packet.

This contrasts with current Internet Protocol (IP) based networks in which messages are routed based on numerically addressed hosts and a connection is secured based on the connection between communicating hosts. However, assuming ICN gains acceptance, consideration of existing IP networks is needed for ICN deployments to bridge the gap between ICN and IP technologies.

Transmitting content to multiple recipients in one transmission using existing Internet protocols such as Transmission Control Protocol (TCP), User Datagram Protocol (UDP), and Internet Protocol (IP) typically requires the deployment of traditional multicast trees such as Internet Group Management Protocol (IGMP) or Protocol Independent Multicast (PIM) or new multicast trees such as Bit-Indexed Explicit Replication (BIER) protocol. These are complex constructs from a network management perspective and these constructs are overkill when the list of recipient of content changes frequently. What is needed is a mechanism, by which the multicast state can be (mostly) ejected from the network, is managed by the end-points/ edge nodes, where multi-cast (or multi-delivery) is carried in IP packets themselves, and thus can be completely managed by end/edge nodes.

Multiple recipient delivery (also referred to herein as 'multi-delivery') embodiments described herein can resolve the aforementioned issues (and others) associated with delivery of content to multiple recipient content node(s) (e.g., one or more of recipient content node(s) 102.1-102.N) from a given parent content node (e.g., parent content node 106) using a multi-delivery capable IP network, such as IP network 110 to which both the recipient and parent content nodes are connected, in which the end nodes can manage content delivery. In general, embodiments described herein provide a reliable ad-hoc multi-delivery solution for content distribution, which can, in various embodiments, incorporate elements of Information-Centric Networking (ICN), Bit-Indexed Explicit Replication (BIER) and Segment Routing (SR) routing techniques in which one or more content requesting node(s) (e.g., recipients) can unicast IP-based content requests to content sending nodes (e.g., senders or parents). In various embodiments, content requests may be carried over Hypertext Transfer Protocol (HTTP)/web technologies or other content-centric networking technologies such as the family of ICN protocols.

In some embodiments, content responses can be multi-delivered by an SR-capable IP network, potentially as HTTP responses over User Datagram Protocol (UDP) sessions using, for example, the Quick UDP Internet Connections (QUIC) protocol suite. A UDP header including identifying source port, a destination port, UDP length information and a UDP checksum can be included in content responses. UDP and multicast provide for the ability to send content to multiple recipients 1:R, where R>1, unlike TCP which only provides for a 1:1 sender/recipient relationship.

Upon obtaining content by a given sender for which the content requests have been received, the sender can respond by sending content packets (generally referred to herein as 'content packets') to all recipients using an ad-hoc network-based multicast message. Multi-delivery embodiments discussed herein can enable the sender of content (e.g., a parent content node) to aggregate individual content requests from one or more recipient content node(s) for a same content in order to identify the one or more recipient content node(s) that have requested the same content. If multiple recipient content nodes are identified that are to receive the content, the parent content node can, when the content is available, generate a message that include the contents and also a multi-delivery header appended, tagged or otherwise added to the flow tuple information for the message. The multi-delivery header can include a list of identifier(s), each of which corresponds to a recipient content node that is to receive the content can be identified in the multi-delivery header. If only one recipient content node is to receive the content, the parent content node can send a unicast message to the recipient content node.

In various embodiments, a multi-delivery header can be formatted as a Segment Routing Header (SRH) or a special Internet Protocol version 6 (IPv6) extension header. Thus, the ad-hoc multi-delivery solution discussed herein can, in various embodiments, integrate existing CCNx and NDN content request techniques with IP routing techniques to make use of SRH or IPv6 extension headers in content response messages to identify all recipient(s) that are to receive requested content and, by sending only a single message, multiple recipients receive the message. This then improves upon CCNx and NDN techniques as no such capability exists in CCNx and/or NDN and provides for the ability to build an ICN with HTTP/web and multi-delivery capabilities.

Referring to FIG. 1B, FIG. 1B is a simplified schematic diagram illustrating a possible configuration of a content packet 114 for at least one embodiment in which an SRH-based multi-delivery header 130 is configured for the content packet 114. For the embodiment of FIG. 1B, content packet 114 can include an IP header 120, a UDP header 128, an SRH multi-delivery header 130 and a data portion 132. IP header 120 can include a prologue portion 122, a source address portion 124 and a destination address portion 126. In at least one embodiment, the prologue portion 122 can include other header information such as transport protocol identification, packet length information, service type information, various flags, checksums, options, combinations thereof or the like that may comprise other portions of an IP packet header. The UDP header 128 that can identify a source port, a destination port, UDP length information and a UDP checksum associated with the packet. The data portion 132 can carry content that is to be delivered to one or more recipient content nodes.

In an IPv6-Segment Routing (SR) deployment, routing nodes 104.1-104.M, recipient content nodes 102.1-102.N and parent content node 106 can be configured to perform SR-routing operations. In general a Segment Routing deployment provides packet steering functionality among nodes using an ordered list of segments. When used in an IPv6 architecture, typically referred to as an IPv6-SR architecture, and supporting multi-delivery functionality an SRH multi-delivery header can carry IPv6 addresses of recipient content nodes to which content is to be delivered. In at least one embodiment, SRH multi-delivery header 130 can carry a list of IPv6 addresses identifying each recipient content node that is to receive certain content. An SRH multi-delivery header can carry other SRH-related information (e.g., flags, etc.), as discussed in further detail herein.

In some embodiments, content requests for a same content sent from multiple recipients can be associated with a same source port value for each recipient. In such embodiments, the SRH multi-delivery header 130 for content packets associated with the requests for the same content can only include the IPv6 addresses identifying each recipient content node that is to receive the content and the UDP header 128 would include a destination port value set to the source port value as received from each recipient and the source port value for the content packets would be set to an associated port of the parent content node 106. In various embodiments, UDP port values can be 16-bit values.

In other embodiments, however, the source port for each content request sent from multiple recipients can be associated with a different source port ID for each recipient. In such embodiments, the SRH multi-delivery header 130 for content packets associated with requests for the same content can include the list of IPv6 addresses identifying each recipient content node that is to receive the content and also list of UDP destination port values associated with each recipient content node that is to receive the content. The UDP header 120 for such embodiments could include a destination port value set to a default multicasting port vale or to any other port value that can facilitate injecting packets from the parent content node 106 into IP network 110 destined to a first routing node in the network.

In some embodiments, IPv6 address and UDP port for a given recipient can be stored in pairs of alternating IPv6 address followed by UDP port value for each recipient and can be referred to collectively as an ID for each recipient (e.g., a first value in the list corresponds to an IPv6 address for a first recipient, the second value in the list corresponds to a UDP port for the first recipient in which the first and second value are considered an ID for the first recipient, the third value in the list corresponds to an IPv6 address for a second recipient, the fourth value in the list corresponds to a UDP port for the second recipient in which the third and fourth value are considered an ID for the second recipient, and so on for all recipients that are to receive the same content). It should be understood that other encoding schemes for storing IPv6 and UDP pairs for recipients can be envisioned within the teachings of the present disclosure depending on needs and implementations for various embodiments described herein. For example, a list of N 128-bit IPv6 addresses could be followed by N 16-bit UDP ports, tightly packed or other encoding schemes could be used.

In general, IPv6 addresses can be represented using a hexadecimal format such as [XXXX:XXXX:XXXX: XXXX:XXXX:XXXX:XXXX:XXXX] in which a network prefix is identified in the 64 Most Significant Bits (MSBs) and a 64-bit interface identifier is identified in the remaining bits.

Referring to FIG. 1C, FIG. 1C is a simplified schematic diagram illustrating a possible configuration of content packet 114 for at least one embodiment in which an IPv6-based multi-delivery header 150 is configured for the content packet 114. For the embodiment of FIG. 1C, content packet 114 can include an IP header 140, a UDP header 148, an IPv6 multi-delivery header 150 and a data portion 152. IP header 140 can include a prologue portion 142, a source address portion 144, a destination portion address 146. In at least one embodiment, the prologue portion 142 can include other header information such as packet length information, service type information, various flags, checksums, options, combinations thereof or the like. The UDP header 148 that can identify a source port, a destination port, UDP length information and a UDP checksum associated with the packet. The data portion 152 can carry content that is to be delivered to one or more recipient content nodes.

In an IPv6 deployment, routing nodes 104.1-104.M, recipient content nodes 102.1-102.N and parent content node can be configured to perform IP-routing operations as defined, for example, in IETF Request For Comments (RFC) 2460. In some embodiments, IPv6 multi-delivery header 150 can be configured as an IPv6 extension header, which can include a list of 128-bit IPv6 address(es) identifying each of one or more recipient node(s) to which the same content packet 114 is to be delivered. In other embodiments, the IPv6 multi-delivery header 150 can also be enhanced to include a list of UDP destination port values associated with each of one or more recipient node(s) to which content is to be delivered (e.g., as discussed above for SRH multi-delivery header 130).

Turning again to FIG. 1A, in at least one embodiment, the reliable ad-hoc multi-delivery solution can be specifically targeted to support the delivery of content from a centralized, parent content node (e.g., parent content node 106) to one or more recipient content nodes (e.g., one or more of recipient content node(s) 102.1-102.N). Recipient content node(s) can request live, linear, Video on Demand (VoD) media, etc. from the parent content node, and the parent content node can, in accordance with at least one embodiment, transmit to the precise set of recipient content node(s) using a single data transmission. In at least one embodiment, the parent content node can rely on IP network 110 for efficient and/or optimal packet delivery and network-based packet replication techniques.

Consider an operational example in which, one or more of recipient content node(s) 102.1-102.N, say, for example, recipient content node 102.1 and recipient content node 102.2, each request the same Dynamic Adaptive Streaming over HTTP (DASH) or HTTP Live Streaming (HLS) media segments, which can generally be referred to herein as 'content'. Each content request can be encapsulating in a content request packet (e.g., content request packet 112.1 for recipient content node 102.1 and content request packet 112.2 for recipient content node 102.2) that can include flow tuple information along with the requested content name. In some embodiments, content requests can include HTTP-over-Quick UDP Internet Connections (HTTP-o-QUIC) GET requests for some DASH or HLS media segment.

Each content request packet 112.1, 112.2 can be sent via one or more routing node(s) (e.g., one or more of routing node(s) 104.1-104.M) to a parent content node (e.g., parent content node 106) at which the requested media segments are either stored or can be retrieved (e.g., from another content node, layer, etc.).

Say, for the present operational example, the requested media segments are stored at parent content node 106. The parent content node 106 can combine the individual content requests for the same media segment and, when the content becomes available, the parent node can send the content to each recipient content node 102.1, 102.2 using single packet transmissions for a flow of packets (e.g., content packet 114) including the content. In various embodiments, parent content node 106 can use a timer-based trigger, a count-based trigger, combinations thereof or the like to determine when a threshold number of content requests have been received for a same content.

The parent content node 106 can include a multi-delivery header in one or more of the content packets 114 for the flow that identifies the recipient content node(s) to which the packets are to be delivered. In case there is only a single recipient for content, the parent content node can send unicast message transmissions to the single recipient.

The multi-delivery header can be encapsulated along with other flow tuple information and the requested content and delivered to each identified recipient content node (e.g., recipient content node 102.1, 102.2) using one or more of the routing node(s) 104.1-104.M of the IP network 110. When a sender (e.g., parent content node 106) transmits a multi-delivery content packet (content packet 114), it selects a first or intermediate routing node (e.g., routing node 104.M) supporting multi-delivery as the destination based on its own IP-based Routing Information Base (RIB) and/or Forwarding Information Base (FIB) (referred to herein as 'RIB/FIB'). A RIB or a Routing Table generally represents a routing table for all routes and/or destinations learned by a node (e.g., router), whereas a FIB generally represents a subset of the RIB routes and/or destinations that may be selected by a routing algorithm, protocol, etc. to identify optimized and/or preferred routes and/or destinations for routing packets in a network. For purposes of embodiments described herein in this Specification, the terms 'RIB' and 'FIB' can be used herein interchangeably.

Each of recipient content nodes 102.1-102.N, routing nodes 104.1-104.M and parent content node 106 can be configured with an IP-based RIB and/or FIB in order to perform packet routing or forwarding operations. TABLE 1, shown below, illustrates various example details that can be associated with an example RIB that may be configured for parent content node 106 in accordance with at least one embodiment of the present disclosure and TABLE 2, also shown below, illustrates various example details that can be associated with an example RIB that may be configured for routing node 104.M.

TABLE 1

EXAMPLE PARENT CONTENT NODE 106 RIB

| DESTINATION ID | NEXT HOP | COST |
|---|---|---|
| RCN 102.1 ADDR [XX . . . XX] | RN 104.M ADDR [XX . . . XX] | ## |
| RCN 102.2 ADDR [XX . . . XX] | RN 104.M ADDR [XX . . . XX] | ## |
| RCN 102.N ADDR [XX . . . XX] | RN 104.M ADDR [XX . . . XX] | ## |

TABLE 2

EXAMPLE ROUTING NODE 104.M RIB

| DESTINATION ID | NEXT HOP | COST |
|---|---|---|
| RCN 102.1 ADDR [XX . . . XX] | RN 104.1 ADDR [XX . . . XX] | ## |
| RCN 102.2 ADDR [XX . . . XX] | RN 104.2 ADDR [XX . . . XX] | ## |
| RCN 102.N ADDR [XX . . . XX] | RN 104.2 ADDR [XX . . . XX] | ## |

As illustrated in TABLES 1 and 2, a RIB can include a list of destination identifiers (IDs) (e.g., IP addresses, labels, etc.), next hop information identifying a next hop to which a packet is to be routed to reach the destination and, optionally, cost information, which can indicate a routing cost or metric associated with the path through which a packet is to be transmitted. Other information such as, for example, interface information (e.g., source/destination port, interface number, etc.) gateway, Medium Access Control (MAC) information, transfer mode or protocol, combinations thereof or the like in accordance with various embodiments.

Returning to the present operational example, parent content node 106 can: select routing node 104.M to receive content packet 114 based on a RIB/FIB lookup to determine that routing node 104.M is the next hop to receive packets that are to be delivered to recipient content node 102.1 and 102.2; populate the prologue of the packet accordingly (e.g., based on configuration for deployment type, etc.); set the source address to correspond to an address of parent content node 106; set the destination address to a default address; set any UDP related port information; generate the multi-delivery header to identify recipient node 102.1 and recipient node 102.2 (e.g., IPv6 addresses); and transmit the content packet 114 to routing node 104.M. In at least one embodiment, the default address can be a default multicast address that can be used for multi-delivery embodiments described herein. In another embodiment, the default address can be any address that can facilitate injecting packets from the parent content node 106 into IP network 110 destined to routing node 104.M.

When a routing node receives a content packet that includes a multi-delivery header, it can analyze the header and compare recipients listed in the header with an IP-based or SR-based RIB/FIB. Based on route analysis for all identification information (e.g., IP addresses and possibly UDP port values) contained in a multi-delivery header and a lookup using the information as compared to its stored RIB/FIB, a routing node can perform any of: (a) determining that the content packet is to be sent to a next-hop routing node as dictated by its RIB/FIB, potentially updating one or more addresses and possibly UDP port values, if necessary, in the multi-delivery header and forwarding the content packet with the multi-delivery header to the next-hop routing node; (b) determining that the content packet is to be sent along diverging paths as dictated by the IP RIB/FIB, identifying and selecting the paths (e.g., other routing nodes) as dictated by the IP RIB/FIB, replicating the content packet for each diverging path, splitting the multi-delivery header into multiple multi-delivery headers for each diverging paths, potentially updating each multiple-delivery header to identify the list of recipient content node(s) to which each replicated content packet is to be delivered and independently transmitting each replicated content packet with its multi-delivery header over the selected paths; or (c) determining that only one recipient content node is identified in the multi-delivery header, replacing the destination IP address and possibly the destination UDP port value for the content packet with the single remaining recipient content node address in the multi-delivery header, removing the multi-delivery header and unicasting (e.g., the last hop is always unicast) the content packet to the recipient content node. Step (b) is important to avoid packet duplication at a given recipient.

For the present operational example, routing node 104.M can analyze the addresses and possibly UDP port values identified in the multi-delivery header and perform a RIB/FIB lookup to determine that it is to forward the content packet to routing node 104.1 in order to deliver the content packet to recipient content node 102.1 and is to forward the content packet to routing node 104.2 in order to deliver the content packet to recipient content node 102.2. Based on the determination, routing node 104.2 can perform operations as discussed in (b) to: split the multi-delivery header into multiple multi-delivery headers for the diverging paths with each multi-delivery header identifying only one recipient content node; replicate the content packet for each diverging path to generate content packet 116.1 and content packet 116.2 and independently transmit each respective replicated content packet 116.1, 116.2 with its respective multi-delivery header over the selected paths to each routing node 104.1, 104.2.

For the present operational example, the multi-delivery header for content packet 116.1 would identify recipient content node 102.1 and content packet 116.2 would identify recipient content node 102.2.

Upon receiving content packet 116.1, routing node 104.1 can analyze the address and possibly UDP port value identified in the multi-delivery header that identifies recipient content node 102.1 and perform a RIB/FIB lookup using the address to determine that it is to forward the content packet to recipient content node 102.1 (as opposed to another routing node). Based on the determination, routing node 104.1 can perform operations as discussed in (c) to: replace the destination IP address and possibly the UDP destination port value for the content packet with the single remaining recipient content node address in the multi-delivery header that corresponds to recipient content node 102.1, remove the multi-delivery header from the content packet to form a content packet 118.1 and unicast the content packet 118.1 to the recipient content node 102.1.

In a similar manner, routing node 104.2, upon receiving content packet 116.2 can analyze the address identified in the multi-delivery header that identifies recipient content node 102.2 and perform a RIB/FIB lookup using the address to determine that it is to forward the content packet to recipient content node 102.2 (as opposed to another routing node). Based on the determination, routing node 104.2 can perform operations as discussed in (c) to: replace the destination IP address and possibly the UDP destination port value for the content packet with the single remaining recipient content node address in the multi-delivery header that corresponds to recipient content node 102.2, remove the multi-delivery header from the content packet to form a content packet 118.2 and unicast the content packet 118.2 to the recipient content node 102.2. Although not shown in the embodiment of FIG. 1A, if the content were also to be sent to RCN 102.N, only a single transmission of content packet 116.2.2 from RN 104.M to RN 104.2 would be needed to deliver the content to both RCN 102.2 and RCN 102.N. RN 104.2 could then replicate the received content packet to deliver the content to each of RCN 102.2 and RCN 102.N

Thus, as shown for the present operational example, communication system 100 can provide a system and method to facilitate reliable ad-hoc multicast content delivery using a multi-delivery header that can be used to identify all content packet destinations, which can enable an IP-based network such as IP network 110 to determine efficient and/or optimal packet forwarding for such packets. The system and method provided by communication system 100 can be especially useful for delivering live/linear and even VoD media across a network using content delivery node applications.

In some embodiments, since (b) can be expensive for IP routers in existing IP-based deployments to implement, the list of recipients identified in the multi-delivery header may travel untouched as a particular content packet traverses the network and the multi-delivery header may be configured to additionally carry a BIER-like bitmap that can be used to select which of the unicast addresses in the multi-delivery header (e.g., which recipient content nodes) are still applicable.

In traditional BIER routing deployments, a BIER bitmap header is included with packets traversing a BIER network. A brief discussion of routing in traditional BIER deployments is provided; however, this discussion is not meant to limit the broad scope of the teachings of the present disclosure but rather is provided to illustrate differences between traditional BIER deployments and the BIER-like bitmap that can be configured for various multi-delivery embodiments discussed herein. When a BIER-capable router in a traditional BIER deployment receives a packet including a BIER bitmap, the router performs a forwarding lookup using a Bit Index Forwarding Table (BIFT) to determine next-hop neighbor routers to which packets are to be forwarded in order to reach certain destinations. If replication is needed for diverging paths, the router can replicate the packet, reset bit(s) in the bitmap based on the destinations to which it is to forward the replicated packets and forwards the packets toward the destinations.

For some multi-delivery embodiments discussed herein, the multi-delivery header can be configured to carry a list of one or more recipient nodes to which a given content packet is to be delivered and also to carry a BIER-like multi-delivery bitmap in which each bit in the bitmap corresponds to a particular recipient content node identified in the recipient list portion of multi-delivery header. At bifurcation points of such embodiments, only the multi-delivery bitmap is updated for the replicated packets such that bits of the bitmap can be reset (e.g., from logical 1 to logical 0 or vice-versa, depending on configuration) to indicate the recipient address(es) and possibly UDP destination port value(s) (e.g., if stored in address/port pairs) to which a given replicated content packet is to be delivered while the addresses included in the multi-delivery can remain unchanged.

As a content packet traverses routing nodes of the IP network, bits of the bitmap will be reset until only one recipient is identified and the content packet can be unicast transmitted to the identified recipient as discussed for (c), above. Thus, in at least some embodiments, RIB/FIB lookups can be performed by a routing node using addresses and possibly UDP port values identified in a multi-delivery header based on which bits are set in the bitmap accompanying the header to determine packet forwarding path(s). Accordingly, the reliable ad-hoc multi-delivery solution can incorporate BIER-like and/or SR routing mechanisms while also taking efficient and/or optimal RIB/FIB-based IP routing mechanisms into consideration when forwarding content packets throughout the multi-delivery capable IP network 110.

Especially in cases where there are many unicast deliveries associated with forwarding packets for a particular flow, the amount of state (e.g., routing decisions) kept in the multi-delivery header may be extensive. In some embodiments, to avoid including having to include an extensive multi-delivery header with every packet of a same IP stream or flow, the reliable ad-hoc multi-delivery solution can provide that packets that are to be delivered as part of a same IP flow can follow the same path as an initial packet for a given IP flow. In such embodiments, as an initial packet for a given flow traverses routing node(s) along the path of the initial packet on its way to be delivered to one or more recipient content node(s), one or more bit(s) in the IP header or the multi-delivery header can be set to signal to each routing node(s) along the path to cache the multi-delivery header for the initial packet and an association of the flow to any routing decision(s) for the packet; thereby, providing for the ability to establish a temporary multicast state for routing nodes 104.1-104.M of the IP network 110. For embodiments in which multicast state information is to be stored at routing nodes, the information can be stored in a multicast state table that can be maintained by a routing node.

As subsequent packets for the given flow are received at the routing node(s), the packets can be identified as belonging to a flow for which temporary multicast state is stored and can be forwarded according the to the state (e.g., according to the previous routing decision(s) stored for the flow). Thus, subsequent packets of a same IP flow can follow the path of the first packet transmission for the flow. Since router caches can periodically time out, multi-delivery headers can, in some embodiments, be periodically included for long-lasting packet flows to periodically refresh these caches.

If the multi-delivery header is configured using an SRH format, one or more bit(s) in the flags or reserved fields of the SRH or in the destination IP address of a packet can be used indicate the use of the SRH multi-delivery header for efficient ad-hoc multi-delivery replication to signal SR-capable IP routing nodes of specific behavior and disposition for each packet of one or more flow(s). For example, this can include, in some embodiments, indicating to routing nodes to cache the multi-delivery header for a flow and/or any routing decision(s) for each packet of the flow. In another embodiment, if the multi-delivery header is to be used as an IPv6 multi-delivery header it can be configured as an IPv6 extension header such that it is self-describing.

In accordance with at least one embodiment, to address initial deployment issues, for example, in cases where a multi-delivery header is not understood by routing nodes, the multi-delivery solution can be implemented in an IP network in which a sparse multi-delivery router overlay can be deployed to address multi-delivery routing. In such embodiments, the overlay routers can be used as next-hops to parse the multi-delivery header and to find efficient (albeit possibly not optimal) network routes. These overlay routers must be provided with a network topology in order to perform forwarding using the underlay network topology.

Several advantages or benefits are provided by the multiple recipient delivery embodiments illustrated and described herein. In at least one embodiment, one benefit of the reliable ad-hoc multi-delivery solution provided by embodiments discussed herein can be to deliver media (e.g., live, linear and/or VoD, etc.) efficiently and reliably across existing (SR-) capable IP networks. This can be achieved by extending the applicability of SR or IPv6 routing techniques such that a parent content node can list all the recipient(s) that are to receive certain content within a multi-delivery header, which can be appended, tagged, or otherwise included along with the flow tuple information for one more packets of a given IP flow.

Moreover, by managing deliveries to recipients by the parent content node, recipient content nodes can receive multicast content as a single unicast message, which means that existing host-based IP stacks do not need to be altered at the recipients. Accordingly, the multi-delivery method provided herein can lead to efficient, if not optimal, packet delivery and can enable recipient application software to receive a packet in its standard IP stack as if the packet was unicast in the first place.

In addition to a request/response type of multi-delivery, embodiments described herein can also be used for pre-placing content at specific edge nodes. Further, in some embodiments, unicast addresses that may be included a multi-delivery header can be used point to individual existing network-based multicast trees. Still further, embodiments discussed herein can provide that both initial content requests and retransmission requests both be facilitated using the same multi-delivery distribution mechanisms. For example, if multi-delivered data packets are lost, recipients can ask for the retransmission of individual packets, packet ranges or entire content across the same reliable ad-hoc multi-delivery tree established for a given flow and each packet for the flow can use its own ad-hoc reliable multi-delivery trees for packet deliveries. Thus, both initial content requests and retransmission requests can use the same multi-delivery distribution mechanisms as provided by the multi-delivery solution discussed herein.

In regards to the infrastructure of communication system 100, communication system 100 can include one or more networks, such as IP network 110, which can represent a series of points or nodes of interconnected communication paths for receiving and transmitting messages (e.g., packets of information) that propagate through the one or more networks. These nodes offer communicative interfaces between nodes (e.g., recipient content nodes 102.1-102.N, parent content node 106, routing nodes 104.1-104.M). A network, such as IP network 110, can comprise any number of hardware and/or software elements coupled to (and in communication with) each other through a communication medium. Such networks can include, but are not limited to, any local area network (LAN), virtual local area network (VLAN), wide area network (WAN) such as the Internet, wireless local area network (WLAN), metropolitan area network (MAN), Intranet, Extranet, virtual private network (VPN), any other appropriate architecture or system that facilitates communications in a network environment or any suitable combination thereof.

Networks through which communications propagate in communication system 100 can use any suitable technologies for communication including wireless (e.g., 3G/4G/5G/nG network, Institute of Electrical and Electronics Engineers (IEEE) Std 802.11™-2012, published Mar. 29, 2012, WiMax, IEEE Std 802.16™-2012, published Aug. 17, 2012, Radio-frequency Identification (RFID), Near Field Communication (NFC), Bluetooth™, etc.) and/or wired (e.g., T1 lines, T3 lines, digital subscriber lines (DSL), Ethernet, etc.) communication. Generally, any suitable means of communication may be used such as electric, sound, light, infrared, and/or radio.

For the embodiment of FIG. 1A, IP network 110 represents the one or more networks in which multi-delivery embodiments described herein may be provisioned. In at least some embodiments, the IP network can be configured such that various nodes (e.g., recipient content nodes, parent content nodes, etc.) can facilitate content-based communications between content nodes.

Communications in a network environment can be referred to herein as 'messages', 'messaging', 'signaling', 'data', 'content', 'objects', 'requests', 'queries', 'responses', 'replies', etc. which may be inclusive of packets. Generally, signaling is referred to in reference to control-plane or management-plane packets while messaging can be referred to in reference to control-plane, management-plane or data-plane packets exchanged for communications at the application level.

A packet is a formatted unit of data and can contain both control information (e.g., source and destination address, etc.) and data, which is also known as payload. In some embodiments, control information can be included in headers and trailers for packets. Messages can be sent and received according to any suitable communication protocols. Suitable communication protocols can include a multi-layered scheme such as the Open Systems Interconnection (OSI) Model, or any derivations or variants thereof.

The terms 'data', 'information', 'content' and/or 'parameters' as used herein can refer to any type of binary, numeric, voice, video, textual, photographic or script data or information or any type of source or object code, or any other suitable data or information in any appropriate format that can be communicated from one point to another using electronic systems (e.g., servers, nodes, routers, computing devices, compute nodes, client nodes, source nodes, recipient content nodes, parent content nodes, etc.) and/or networks.

As referred to herein in this Specification, an 'IP flow' or 'IP stream' can refer to a sequence of packets that can be identified using flow tuple information (generally referred to as a 'flow mask') such as, for example, a 2-tuple, a 5-tuple, a 6-tuple, a 7-tuple flow mask or any other flow mask that can provide for consistent identification of each packet belonging to a particular IP flow. A 2-tuple flow mask can identify a source IP address and a destination IP address for a packet. A 5-tuple flow mask can identify a source IP address, a destination IP address, a source port, a destination port and a transport protocol for a packet. A 6-tuple flow mask can include tunnel endpoint identifier information in addition to 5-tuple flow mask information. A 7-tuple flow mask can include an attachment circuit identifier (e.g., virtual local area network (VLAN) identifier, Multiprotocol Label Switching (MPLS) label, etc.) in addition to 6-tuple flow mask. Other flow mask can be envisioned and/or may be standardized for IP packets by standard setting organizations such as 3GPP, Institute of Electrical and Electronics Engineers (IEEE), Internet Engineering Task Force (IETF), European Telecommunications Standards Institute (ETSI) or the like in accordance with various embodiments described herein.

In various embodiments, communication system 100 may implement User Datagram Protocol/Internet Protocol (UDP/IP) connections and/or Transmission Control Protocol/IP (TCP/IP) connections in particular embodiments of the present disclosure. However, communication system 100 can alternatively implement any other suitable communication protocol, interface and/or standard, proprietary and/or non-proprietary, for transmitting and receiving messaging and/or signaling.

The terms 'node', 'router' or variations thereof can be inclusive of devices used to initiate and/or respond to communications (e.g., content request packets, content packets, etc.) in a network, such as a computer, an electronic device such as an (IoT) device (e.g., an appliance, a thermostat, a sensor, a parking meter, etc.), a personal digital assistant (PDA), a laptop or electronic notebook, a gaming system, a vehicle infotainment system, a smart television, a cellular telephone, an IP phone, an electronic device having cellular and/or Wi-Fi connection capabilities, a wearable electronic device or any other device, component, element, or object capable of initiating voice, audio, video, media, or data exchanges within communication system 100. A node or router may also be inclusive of a suitable interface to a human user such as a microphone, a display, a keyboard, or other terminal equipment.

A node or router may also be any device that seeks to initiate a communication on behalf of another entity or element such as a program, application, a database, or any other component, device, element, or object capable of initiating an exchange within communication system 100. Within communication system 100, IP addresses (e.g., for recipient content nodes 102.1-102.N, routing nodes 104.1-104.M, parent content node 106, etc.) can be assigned using Dynamic Host Configuration Protocol (DHCP), Stateless Address Auto-configuration (SLAAC), or any suitable variation thereof. IP addresses used within communication system 100 can include IP version 4 (IPv4) and/or IPv6 addresses.

In at least some embodiments, one or more of recipient content node(s) 102.1-102.N and/or possibly parent content node 106, can be associated with users that communicate in communication system 100 via IP network 110. In other embodiments, one or more of recipient content node(s) and/or possibly parent content node 106 may facilitate data exchanges via IP network 110 while operating independently of user interactions. Although various functions are described herein as relating to either a recipient content node or a parent content node, it should be apparent that a node could be configured to act as both a recipient and a parent content node. For example, in some embodiments, a parent content node can be a recipient in itself and/or a recipient content node can be a parent content node if the content network in which a content node resides is maintained as a hierarchy. For example, a video conference call established over IP network 110 could include nodes associated with respective users, and configured to act as both parents and recipients of the video content. Thus, elements of recipient content nodes 102.1-102.N and parent content node 106 may be provisioned in any suitable arrangement or configuration to achieve the operational features of a recipient content node, a parent content node, or a suitable combination thereof.

Referring to FIG. 2A, FIG. 2A is a simplified block diagram 200 illustrating example details that can be associated with routing operations that can be performed for a BIER-like multi-delivery use case in accordance with one potential embodiment of communication system 100 in which BIER-like multi-delivery bitmaps are included in various multi-delivery content packets. FIGS. 2B-2H are schematic diagrams illustrating example details for various packets that can be associated with the example use case of FIG. 2A. FIG. 2A includes IP network 110, recipient content nodes (RCNs) 102.1-102.N, routing nodes (RNs) 104.1-104.M and parent content node (PCN) 106. For the embodiment of FIG. 2A, it is assumed that RCN 102.1 and RCN 102.2 each send a content request to PCN 106 for a same content. It should be understood, however, that any number of RCNs could send content requests to any content node that may obtain content for the requests. For the embodiment FIG. 2A, the multi-delivery header for content packets can be associated with an SRH multi-delivery header (an SRH prologue, as discussed in further detail below, is not shown in FIG. 2A for purposes of brevity only) or an IPv6 multi-delivery header.

Figure 2B:
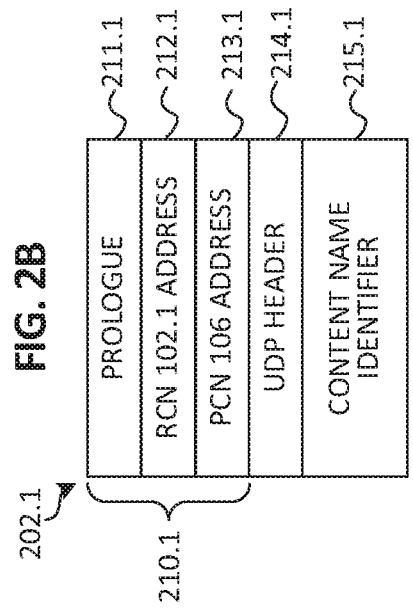

For the BIER-like bitmap use case of the present embodiment, RCN 102.1 can send a content request packet 202.1, as illustrated in FIG. 2B, to RN 104.1 for delivery to PCN 106 and RCN 102.2 can send a content request packet 202.2, as illustrated in FIG. 2C, to RN 104.2 for delivery to PCN 106. As illustrated in FIG. 2B, content request packet 202.1 can include an IP header 210.1, a UDP header 214.1, and a content name identifier portion 215.1. The IP header 210.1 can include a prologue portion 211.1, a source address portion 212.1 set to the address of RCN 102.1 and a destination address portion 213.1 set to the address of PCN 106. The UDP header 214.1 can identify a source port value for RCN 102.1 associated with the content requested (e.g., a port assigned or configured to handle the content), a destination port value for PCN 106 associated with the content requested, UDP length information and a UDP checksum.

The content name identifier portion 215.1 can be set to indicate the particular content segment that the RCN 102.1 is requesting say, for example, /cisco/<mediaID>/video/<frameID>/<segment #>. In general, the content name identifier portion can be similar to an HTTP Uniform Resource Locator (URL) or an ICN name.

As illustrated in FIG. 2C, content request packet 202.2 can include an IP header 210.2, a UDP header 214.2 and a content name identifier portion 215.2. The IP header 210.2 can include a prologue portion 211.2, a source address portion 212.2 set to the address of RCN 102.2 and a destination address portion 213.2 set to the address of PCN 106. The UDP header 214.2 can identify a source port value for RCN 102.2 associated with the content requested, a destination port value for PCN 106 associated with the content requested, UDP length information and a UDP checksum. The content name identifier portion 215.2 can be set to indicate the same content segment as included in content request packet 202.1.

As discussed above, in some embodiments, the source port value of RCN 102.1 and the source port value of RCN 102.2 can be the same value for the content requests. In other embodiments, the source port values for each RCN can be different values. Depending on whether the system is configured such that each RCN is to use the same or different values can determine whether content packets including multi-delivery headers include only IPv6 addresses for the recipients or IPv6 addresses and also UDP port values for the recipients. For the embodiment of FIG. 2A, it is assumed that the source port values for RCN 102.1 for content request 202.1 and for RCN 102.2 for content request 202.2 are the same.

The content request packets 202.1, 202.2 can be routed through the IP network 110 via RNs 104.1-104.M using IP-based RIB/FIB lookups until the request packets reach PCN 106. For the bit-indexed use case of the present embodiment, it is assumed that the content becomes available at PCN 106, which can either have the content already stored thereat or can receive or retrieve the content from another content node in the network. Once the content is available, PCN 106 can generate a flow of content packets to communicate the content to each recipient content node 102.1, 102.2. PCN 106 can perform a RIB/FIB lookup to select RN 104.M as a first or intermediate routing node to receive the flow of packets from PCN 106 for delivery to RCN 102.1 and 102.2. The flow of content packets can begin with an initial content packet 204, as discussed for FIG. 2D, being sent to RN 104.M.

PCN 106 can generate the content packet 204 to include (as shown in FIG. 2D) an IP header 220, a UDP header 224, a multi-delivery header 230 and a data portion 240. The IP header 220 includes a prologue portion 221, a source address portion 222 set to the PCN 106 address, a destination address portion 223 set to a default address (e.g., a default multicast address set for IP network 110 or any other destination address that makes the packet travel to a first router for the IP network). For the embodiment of FIG. 2A, the UDP header 224 can identify a source port value set to a source port of PCN 106 associated with the content, a destination port value set to the value of the source ports for each RCN 102.1, 102.2 (e.g., which is assumed to be the same for the present embodiment), UDP length information and a UDP checksum. The multi-delivery header 230 includes a recipient list portion 231 and a multi-delivery bitmap portion 232. Content packet 204 also includes a data portion 240 that can carry a portion of the content requested.

The recipient list portion 231 can be set to include a first identifier (ID) value associated with RCN 102.1 and a second ID value associated with RCN 102.2. In at least one embodiment, each ID value can be set to an IPv6 address associated with each RCN. In another embodiment, each ID value can correspond to an IPv6 address and a UDP port associated with each RCN. Other IDs (e.g., other IP address types, etc.) can be envisioned for use with a multi-delivery header in accordance with the teachings of the present disclosure.

For the BIER-like bitmap use case of the present embodiment, multi-delivery bitmap portion 232 can include a 2-bit bitmap in which each bit is associated with an ID value included in the recipient list portion 231. For the present embodiment, it is assumed that the least significant bit (LSB) corresponds to the first ID value (RCN 102.1 ID) in the recipient list portion 231 and the MSB corresponds to the last ID value (RCN 102.2 ID) in the recipient list portion 231. The bit to recipient list correspondence illustrated for the present embodiment is provided for illustrative purposes only and is not meant to limit the broad scope of the teachings of the present disclosure. It should be understood that any bit to recipient list correspondence could be configured for a given communication system in accordance with embodiments described herein.

Upon receiving content packet 204, RN 104.M can analyze the multi-delivery header 230, in particular, the multi-delivery bitmap portion 232, to determine that the content packet is to be delivered to the first and the second recipients identified in the recipient list portion 231 of the content packet 204 (e.g., since both the first bit (the LSB) and the last bit (the MSB) of the multi-delivery bitmap portion 232 are set to a logical 1). Using the RCN 102.1 ID and the RCN 102.2 ID included in the recipient list portion 231 and any other flow tuple information for the packet, RN 104.M can perform a lookup on its RIB/FIB to determine that the content is to be sent along diverging paths in order to be delivered to RCN 102.1, 102.2. Based on the determination, RN 104.M can split the multi-delivery header into two headers and can replicate the content packet so that each replicated packet can be sent along the diverging paths.

RN 104.M can generate content packet 206.1, as illustrated in FIG. 2E, to be sent toward RCN 102.1 and can generate content packet 206.2, as illustrated in FIG. 2F, to be sent toward RCN 102.2. As illustrated in FIG. 2E, content packet 206.1 includes an IP header 250.1, a UDP header 254.1, a multi-delivery header 260.1 and a data portion 270.1. The IP header 250.1 includes a prologue portion 251.1, a source address portion 252.1 set to the PCN 106 address and a destination address portion 253.1 set to the default address. For the embodiment of FIG. 2A, the UDP header 254.1 identifies the source port value associated with PCN 106, the destination port value set to the value of source port value for each RCN 102.1, 102.2 (e.g., which is assumed to be the same for the present embodiment), UDP length information and the UDP checksum. The multi-delivery header 260.1 includes a recipient list portion 261.1 and a multi-delivery bitmap portion 262.1. Content packet 206.1 also includes a data portion 270.1 that can carry the portion of the content received in the data portion 240 of content packet 204.

For the recipient list portion 261.1, the first ID remains unchanged and set to the RCN 102.1 ID value and the second ID remains unchanged and set to the RCN 102.2 ID value. For the multi-delivery bitmap portion 262.1, RN 104.M can reset the MSB while maintaining the LSB set to the logical 1 value (e.g., to identify the RCN 102.1 ID value as active for routing content packet 206.1).

By providing a multi-delivery bitmap portion within a multi-delivery header of content packets, routing nodes in the IP network do not have to update the recipient list in order to avoid duplication of a same packet being received at RCN 102.1. Rather, updates to the multi-delivery bitmap portion of the multi-delivery header can be performed to avoid packet duplication. RN 104.M can transmit content packet 206.1 to RN 104.1 based on the RIB/FIB lookup using the RCN 102.1 ID.

As illustrated in FIG. 2F, content packet 206.2 can include an IP header 250.2, a UDP header 254.2, a multi-delivery header 260.2 and a data portion 270.2. The IP header 250.2 includes a prologue portion 251.2, a source address portion 252.2 set to the PCN 106 address and a destination address 253.2 set to the default address. For the embodiment of FIG. 2A, The UDP header 254.2 values can be set as discussed above for content packet 206.1. The multi-delivery header 260.2 includes a recipient list portion 261.2 and a multi-delivery bitmap portion 262.2. Content packet 206.2 also includes a data portion 270.2 that can carry the portion of the content received in the data portion 240 of content packet 204.

For the recipient list portion 261.2, the first ID remains unchanged and set to the RCN 102.1 ID value and the second ID also remains unchanged and set to the RCN 102.2 ID value. For the multi-delivery bitmap portion 262.2, RN 104.M can reset the LSB while maintaining the MSB set to the logical 1 value (e.g., to identify the RCN 102.2 ID value as active for routing content packet 206.2). In this manner, duplication of a same packet being received at RCN 102.2 can be avoided. RN 104.M can transmit content packet 206.2 to RN 104.2 based on the RIB/FIB lookup using the RCN 102.2 ID.

As noted previously, only a single transmission is needed for recipient content nodes on a same path. If the content were also to be sent to RCN 102.N, only a single transmission of content packet 206.2 from RN 104.M to RN 104.2 would be needed to deliver the content to both RCN 102.2 and RCN 102.N. RN 104.2 could then replicate the received content packet to deliver the content to each of RCN 102.2 and RCN 102.N Returning to the present example, upon receiving content packet 206.1, RN 104.1 can analyze the multi-delivery header 260.1, in particular, the multi-delivery bitmap portion 262.1, to determine that the content packet is to be delivered to the first recipient identified in the recipient list portion 261.1 of the content packet 206.1 (e.g., since only the LSB of the multi-delivery bitmap portion 262.1 is set to a logical 1). Using the RCN 102.1 ID included in the recipient list portion 261.1, RN 104.1 can perform a lookup on its RIB/FIB to determine that the content is to be delivered to RCN 102.1 with which RN 104.1 directly interfaces. Based on the determination, RN 104.1 removes the multi-delivery header 260.1 and updates the destination address to generate a content packet 208.1, as illustrated in FIG. 2G, that can be sent to RCN 102.1.

As illustrated in FIG. 2G, content packet 208.1 can include an IP header 280.1, a UDP header 284.1 and a content portion 290.1. The IP header 280.1 includes a prologue portion 281.1, a source address portion 282.1 set to the PCN 106 address and a destination address portion 283.1 set to the RCN 102.1 address. For the embodiment of FIG. 2A, the UDP header 284.1 values can be set as discussed above for content packet 206.1. The data portion 290.1 can carry the content received in the data portion 270.1 of content packet 206.1. RN 104.1 can unicast transmit content packet 208.1 to RCN 102.1 based on the RIB/FIB lookup using the RCN 102.1 ID.

Upon receiving content packet 206.2, RN 104.2 can analyze the multi-delivery header 260.2, in particular, the multi-delivery bitmap portion 262.2, to determine that the content packet is to be delivered to the second recipient identified in the recipient list portion 261.2 of the content packet 206.2 (e.g., since only the MSB of the multi-delivery bitmap portion 262.2 is set to a logical 1). Using the RCN 102.2 ID included in the recipient list portion 261.2, RN 104.2 can perform a lookup on its RIB/FIB to determine that the content is to be delivered to RCN 102.2 with which RN 104.2 directly interfaces. Based on the determination, RN 104.2 can remove the multi-delivery header 260.2 and updates the destination address to generate a content packet 208.2, as illustrated in FIG. 2H, that can be sent to RCN 102.2.

As illustrated in FIG. 2H, content packet 208.2 can include an IP header 280.2, a UDP header 284.2 and a data portion 290.2. The IP header 280.2 includes a prologue portion 281.2, a source address portion 282.2 set to the PCN 106 address and a destination address portion 283.2 set to the RCN 102.1 address. For the embodiment of FIG. 2A, the UDP header 284.2 values can be set as discussed above for content packet 206.2. The data portion 290.2 can carry the content received in the data portion 270.2 of content packet 206.2. RN 104.2 can unicast transmit content packet 208.2 to RCN 102.2 based on the RIB/FIB lookup using the RCN 102.2 ID.

Thus, as shown in FIGS. 2A-2F, communication system 100 can facilitate the delivery of content to multiple recipients using BIER-like features. RIB/FIB lookups can be performed by a routing node using addresses and possibly UDP port values identified in a multi-delivery header based on which bits are set in the bitmap accompanying the header to determine packet forwarding path(s). Thus, through the incorporation of a BIER-like multi-delivery bitmap with the multi-delivery header, packet duplication at recipient content nodes can be avoided and updates to the recipient list portion of the header can also be avoided, which can improve routing efficiency in comparison to embodiments in which no bitmap portion is included with multi-delivery headers.

Referring to FIGS. 3A-3B, FIGS. 3A-3B are simplified schematic diagrams illustrating example details for various content packets that can be associated with various embodiments of communication system 100. In particular, FIGS. 3A-3B can be associated with multi-delivery embodiments in which an indication can be signaled to routing nodes 104.1-104.M to establish or update a temporary multicast state for a particular flow of content packets. Establishing or updating a temporary multicast state for a particular flow of content packets can include caching a multi-delivery header included with an initial packet for the flow, storing any flow tuple information that can be used to identify subsequent packet(s) for the flow and also storing any routing decision(s) associated with the initial packet that are to be applied to one or more subsequent packet(s).

Referring to FIG. 3A, FIG. 3A is a simplified schematic diagram illustrating an example content packet 302 that includes an IP header 310, a UDP header 314, an SRH multi-delivery header 320 and a data portion 340. The IP header 310 can include a prologue portion 311, a source address portion 312 and a destination address portion 313. The SRH multi-delivery header 320 can include an SRH prologue portion 321, a recipient list portion 322 and, in some embodiments, a bitmap portion 323.

In at least one embodiment, the SRH prologue portion 321 can include various SRH fields including a Next Header field 321.1, a header extension length (Hdr Ext Len) field 321.2 used to indicate the length of the SRH multi-delivery header 320, a Routing Type field 321.3, a Segments Left field 321.4, a First Segment field 321.5, a Flags field 321.6 and a Reserved field 321.7. In one embodiment, the recipient list portion 322 can include a list of 128-bit IPv6 addresses for each recipient content node that content in the data portion 340 is to be delivered. In another embodiment, the recipient list portion 322 can include a list of 128-bit IPv6 addresses and a UDP port value for each recipient content node that content in the data portion 340 is to be delivered In various embodiments, one or more bits of the Flags field 321.6 and/or of the Reserved field 321.7 can be set to indicate that a routing node is to establish or update a temporary multicast state for a particular flow.

Referring to FIG. 3B, FIG. 3B is a simplified schematic diagram illustrating an example content packet 352 that includes an IP header 360, a UDP header 364, an IPv6 multi-delivery header 370 and a data portion 380. The IP header 360 can include a prologue portion 361, a source address portion 362 and a destination address portion 363. The IPv6 multi-delivery header 370 can include a recipient list portion 371 and, in some embodiments, a bitmap portion 373. In one embodiment, the recipient list portion 322 can include a list of 128-bit IPv6 addresses for each recipient content node that content in the data portion 380 is to be delivered. In another embodiment, the recipient list portion 322 can include a list of 128-bit IPv6 addresses and a UDP port value for each recipient content node that content in the data portion 340 is to be delivered In at least one embodiment, the prologue portion 361 can include a Version field 361.1, a Traffic Class field 361.2, a Flow Label field 361.4, a Payload Length field 361.4, a Next Header field 361.5 and a Hop Limit field 361.1. In at least one embodiment, the Next Header field 361.5 can be set to a value that indicates that the next header is of an extension type 'multi-delivery header', which can be a vendor defined extension type. In some embodiments, a pseudo-header (not shown) can be included after the destination address portion of an IP header and the pseudo-header can include a Next Header field. In various embodiments, multiple extension headers as well as an upper-layer protocol header (e.g., UDP header 364) can be included in content packets.

Referring to FIG. 4, FIG. 4 is a simplified flow diagram illustrating example details that can be associated with example operations 400 that can facilitate content delivery to multiple recipients in a network environment in accordance with one potential embodiment of communication system 100. In particular, operations illustrated in the embodiment of FIG. 4 can be associated with operations that can be performed by a parent content node (e.g., parent content node 106) in accordance with at least one embodiment of communication system 100.

At any time during operation, a parent content node can receive requests from one or more recipient content nodes for a same content. Thus, beginning at 402, the operations can include the parent content node determining that multiple recipient content nodes are to receive a same content. In one embodiment, the determining performed at 402 can include the parent content node determining that a threshold number of content requests for the same content have been received and that the content is available to send to the recipient content nodes. In another embodiment, the determining performed at 402 can include the parent content node determining that a threshold time has been reached for a request timer associated with content requests and that the content is available to send to the recipient content nodes. A request timer can be set to indicate a threshold time during which the parent content node awaits other content requests to be received for a same content. In one embodiment, a request timer can be initiated when a first request is received for a particular content. If no other requests for the same content have been received at expiration of the request timer, the parent content node can unicast the content to the single recipient content node that requested the content without inclusion of a multi-delivery header in the transmission.

At 404, the operations can include the parent content node generating a multi-delivery header that includes, at least in part, a plurality of identifiers that are to facilitate delivery of the same content to each of the multiple recipient content nodes. In one embodiment, the plurality of identifiers can be associated with IPv6 addresses such that each IPv6 address identifies a corresponding recipient content node to which the content is to be delivered. In another embodiment, the plurality of identifiers can be associated with IPv6 address and UDP port value pairs such that each IPv6 address and UDP port value pair identifies a corresponding recipient content node to which the content is to be delivered.

In one embodiment, the operations at 404 can include the parent content node determining that the content is available prior to generating the multi-delivery header. In such an embodiment, the parent content node can determine whether the requested content is currently stored at the parent content node. If it is not currently stored at the parent content node, the parent can determine another parent content node at which the content is stored and request the content from such parent content node; thereby, changing its role form a parent content node to a recipient content node.

At 406, the operations can include the parent content node appending the multi-delivery header to one or more packets of an IP flow associated with the same content and, the parent content node can transmit packets for the IP flow to each of the multiple recipient content nodes. In one embodiment, the operations at 406 can include the parent content node appending every packet of the IP flow with the multi-delivery header. In another embodiment, the operations at 406 can include the parent content node appending only the initial packet of the IP flow with the multi-delivery header. In yet another embodiment, the operations at 406 can include the parent content node appending the initial packet of the IP flow with the multi-delivery header and thereafter appending the header to one or more subsequent packet for the flow based on an elapsed time that the flow has been sustained, a number of packets transmitted for the flow, combinations thereof or the like.

The operations can return to 402 in which the parent content node can await other content requests. In various embodiments, a parent content node can be configured handle multiple requests, flows, etc. for multiple content segments in parallel.

Referring to FIGS. 5A-5D, FIGS. 5A-5D are a simplified flow diagram illustrating other example details that can be associated with example operations 500 that can facilitate content delivery to multiple recipients in a network environment in accordance with one potential embodiment of communication system 100. In particular, operations illustrated in the embodiment of FIGS. 5A-5D can be associated with operations that can be performed by a routing node (e.g., any routing node 104.1-104.M) in accordance with at least one embodiment of communication system 100.

Figure 5A:
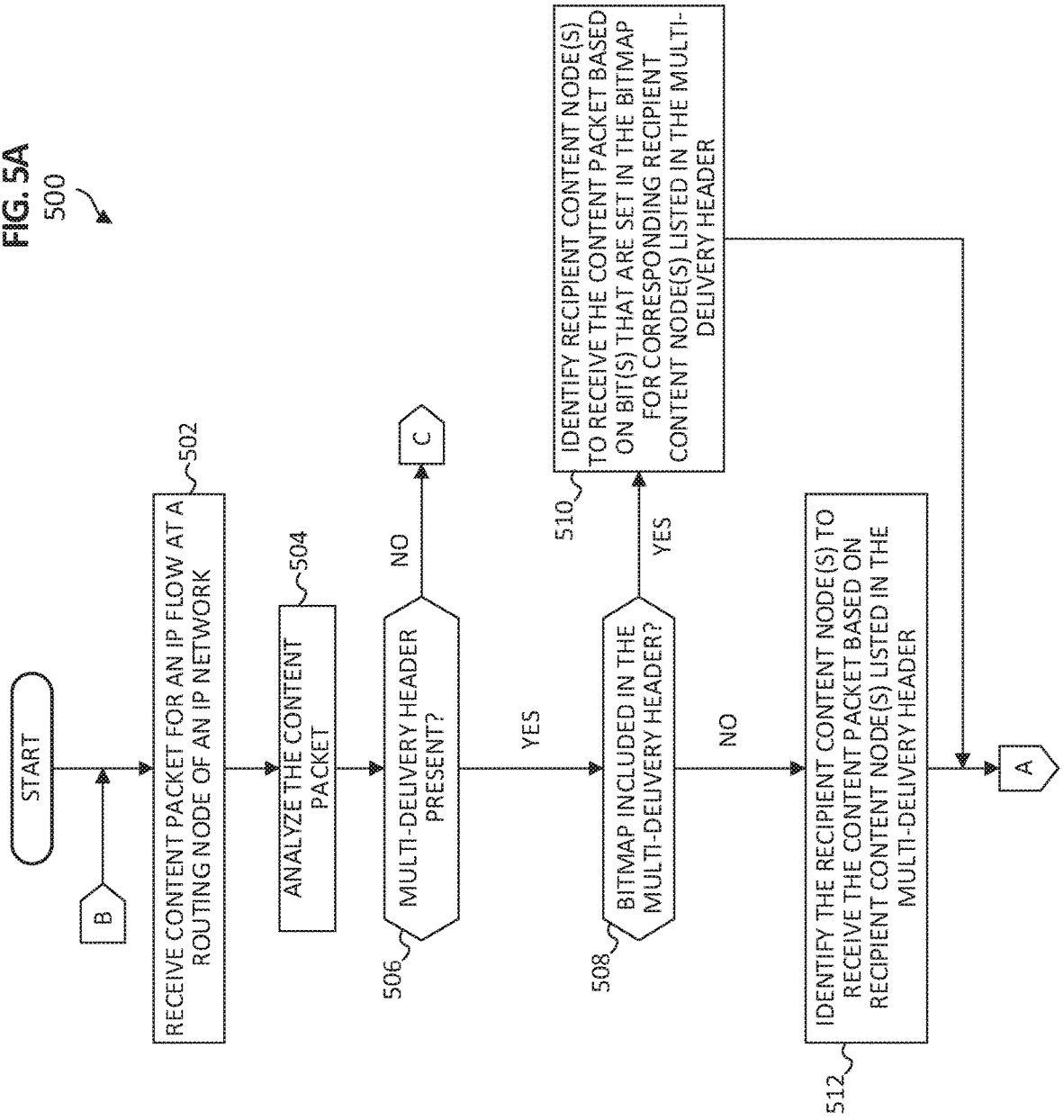
FIGS. 5A-5D are a simplified flow diagram illustrating other example details that can be associated with example operations that can facilitate content delivery to multiple recipients in a network environment in accordance with one potential embodiment of the communication system.

At any time during operation, a routing node can receive a content packet that is to be forwarded toward one or more recipient content nodes. Thus, beginning at 502 as illustrated in FIG. 5A, the operations can include a routing node receiving a content packet for an IP flow within an IP network. Depending on the configuration of communication system 100, the content packet may or may not include a multi-delivery header (e.g., if the header is only to be included with a first packet or for one or more subsequent packets of the flow). At 504, the operations can include the routing node analyzing the content packet in order to determine (506) whether a multi-delivery header is present for the content packet. In one embodiment, the analyzing at 504 can include determining whether a Next Header in the prologue portion if the IP header for the packet indicates that an IPv6 multi-delivery header is present. In another embodiment, the analyzing at 504 can include determining whether an SRH multi-delivery header is present for the packet based on an SRH header included with the packet.

Figure 5B:
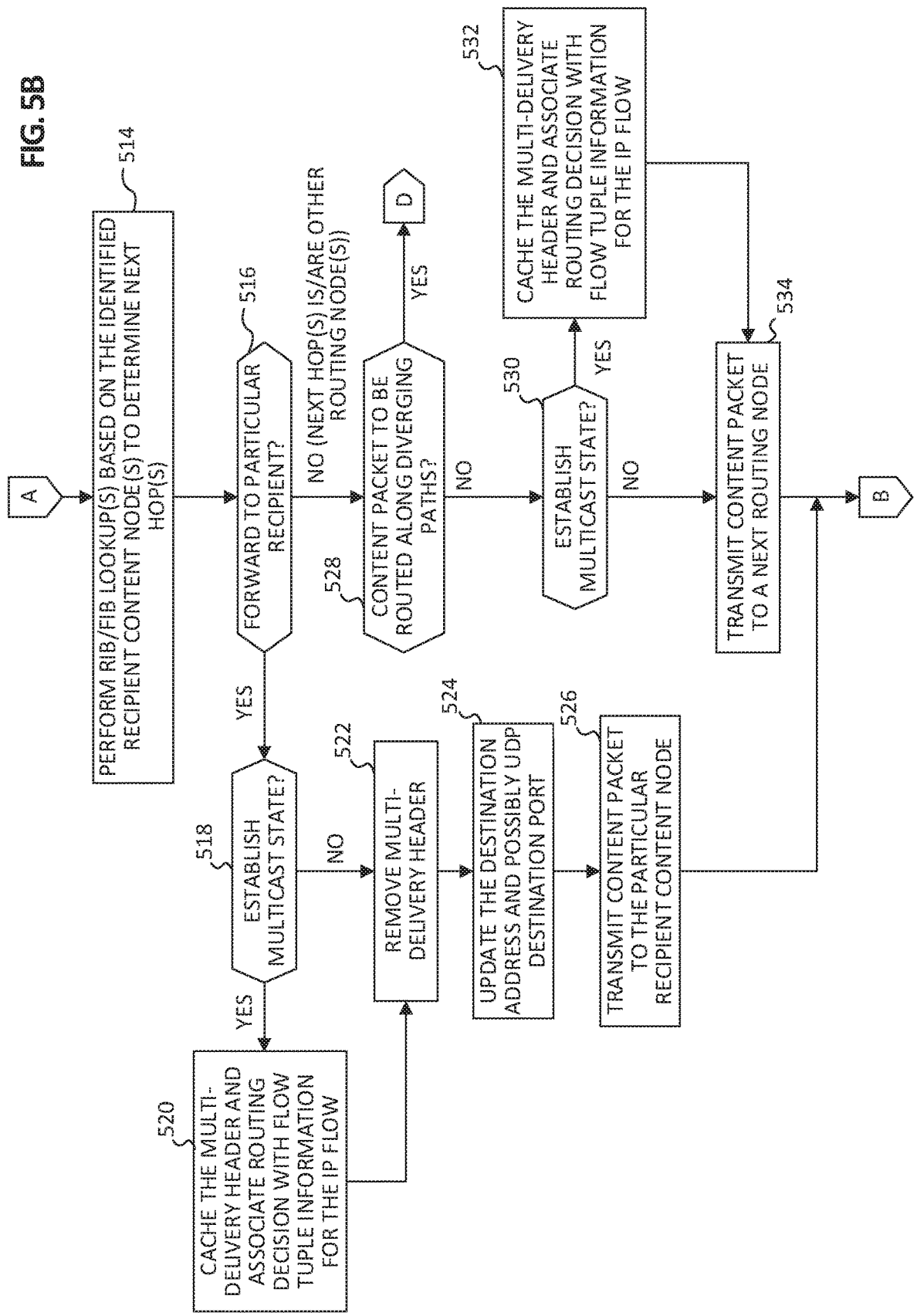
Figure 5C:
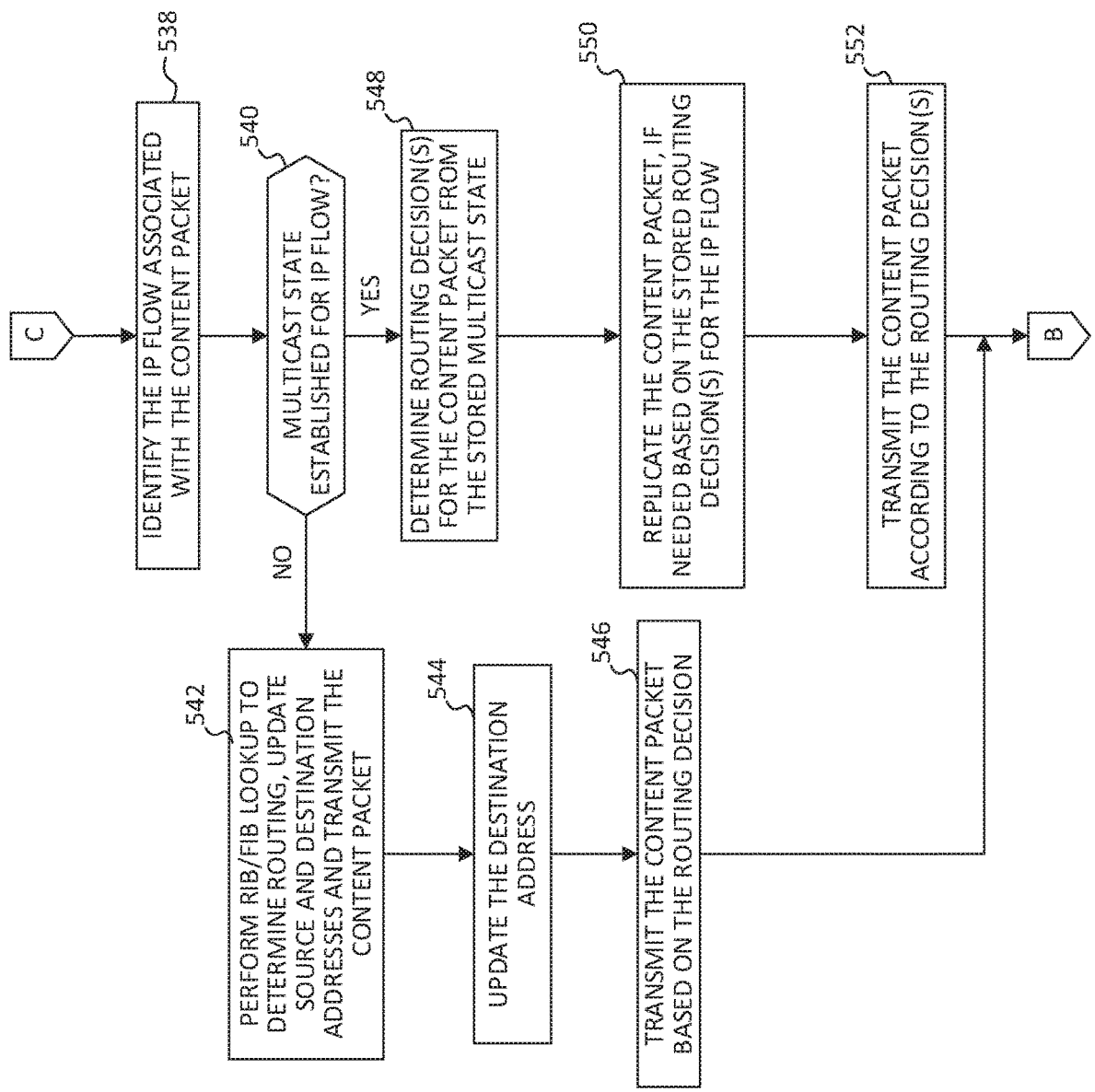

Based on a determination at 506 that no multi-delivery header is present for the content packet, the operations can continue to 538 as illustrated in FIG. 5C and discussed in further detail below. Based on a determination at 506 that a multi-delivery header is present for the content packet, the operations can include the routing node further determining (508) whether a multi-delivery bitmap is included in the multi-delivery header.

Based on a determination at 508 that a multi-delivery bitmap is included in the multi-delivery header, the operations can include the routing node identifying at 510 one or more recipient content node(s) that are to receive the content packet based on one or more bit(s) that are set in the bitmap for corresponding recipient content node(s) listed in the multi-delivery header. Based on a determination at 508 that a multi-delivery bitmap is not included in the multi-delivery header, the operations can include the routing node identifying at 512 one or more recipient content node(s) that are to receive the content packet based on recipient content node(s) listed in the multi-delivery header (e.g., using IPv6 addresses and possibly UDP port values listed in the multi-delivery header). The operations can continue to 514 as illustrated in FIG. 5B.

At 514, operations can include the routing node performing RIB/FIB lookup(s) based on the identified recipient content node(s) (e.g., using recipient addresses and possibly UDP port values, etc.) to determine next hop(s) for the content packet. The lookup can be based on the recipient content nodes identified in the multi-delivery header using the bitmap as discussed for 510. At 516, the operations can include the routing node determining, based on the lookup, whether the content packet is to be forwarded from the routing node to a particular recipient content node. Based on a determination at 516 that the content packet is to be delivered to a particular recipient content node, the operations can continue to 518 at which the routing node determines whether it is to establish a temporary multicast state for the IP flow. In one embodiment, the determining operations at 518 can include the routing node determining whether any bit(s) are set in the IP header or the multi-delivery header that indicates to the routing node that it is to establish a temporary multicast state for a flow. In another embodiment, the determining operations at 518 can include the routing node determining that it is to establish a temporary multicast state based on a particular IPv6 extension header type configured for the IP network 110.

Based on a determination at 518 that the routing node is to establish a temporary multicast state for the IP flow, the operations can continue to 520 at which the routing node caches the multi-delivery header for the content packet and associates the routing decision with flow tuple (e.g., 5-tuple, etc.) for the IP flow and the operations continue to 522. The association can be stored in a multicast state table maintained by the routing node. Based on a determination at 518 that the routing node is not to establish a temporary multicast state for the flow, the operations can continue 522.

At 522, the operations can include the routing node removing the multi-delivery header. At 524, the operations can include the routing node updating the destination address in the IP header of the content packet to be the IP address of the particular recipient content node and possibly updating the UDP destination port value in the packet (e.g., if recipient content nodes have different UDP port values for content requests for a same content) and, at 526 the routing node transmits the content packet to the particular recipient content node. Following the operations at 526, the operations can return to 502 such that the operations can be repeated for any additional content packets received by the routing node.

Recalling the operations at 516, based on a determination at 516 that the content packet is not to be delivered to a particular recipient content node but rather the next hop(s) is/are other routing node(s), the operations can continue to 528 at which the routing node determines whether the content packet is to be routed along diverging paths in order to be delivered to the recipient content node(s).

Figure 5D:
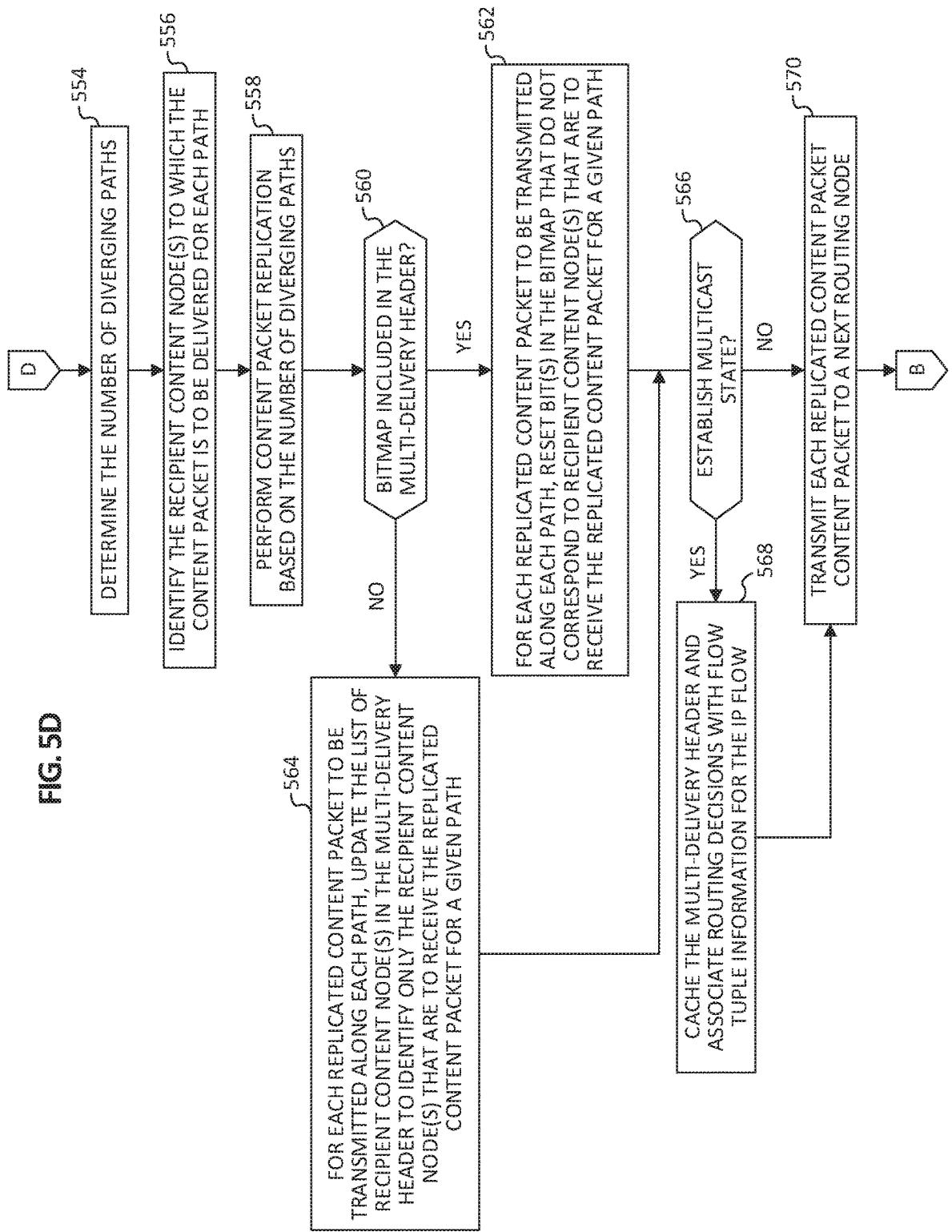

Based on a determination at 528 that the content packet is to be routed along diverging paths, the operations can continue to 554 as illustrated in FIG. 5D and discussed in further detail below. However, based on a determination at 528 that the content packet is not to be routed along diverging paths, the operations can continue to 530 at which the routing node determines whether it is to establish a temporary multicast state for the IP flow. The determining operations at 530 can be performed as described above for 518 in accordance with various embodiments.

Based on a determination at 530 that the routing node is to establish a temporary multicast state for the IP flow, the operations can continue to 532 at which the routing node caches the multi-delivery header for the content packet and associates the routing decision with flow tuple (e.g., 5-tuple, etc.) for the IP flow and the operations continue to 534. The association can be stored in a multicast state table maintained by the routing node. Based on a determination at 530 that the routing node is not to establish a temporary multicast state for the flow, the operations can continue 534. At 534, the routing node transmits the content packet to a next routing node, as determined from the RIB/FIB lookup. The next routing node can also perform operations as discussed for various embodiments described herein. Following the transmitting, the operations can return to 502 such that the operations can be repeated for any additional content packets received by the routing node.

Recalling the operations at 506, based on a determination at 506 that no multi-delivery header is present for the content packet, the operations can continue to 538 as illustrated in FIG. 5C as noted previously. At 538, the operations can include the routing node identifying the IP flow associated with the content packet based on the flow tuple information for the packet. At 540, the operations can include the routing node determining whether a temporary multicast state has previously been established for the flow by performing a lookup on the multicast state table maintained at the routing node using the flow tuple for the IP flow.

Based on a determination at 540 that no multicast state has been established for the IP flow, the operations can continue to 542 at which the routing node performs a RIB/FIB lookup using the source and destination addresses in the IP header for the content packet. At 544, the routing node updates the destination address based on the lookup and, at 546, the routing node transmits the content packet based on the routing decision using normal IP routing procedures. Following the transmitting, the operations can return to 502 such that the operations can be repeated for any additional content packets received by the routing node.

Recalling the operations at 540, based on a determination that a multicast state has been established for the IP flow, the operations can continue to 548 at which the routing node determines routing decision(s) for the content packet from the stored multicast state by either performing a lookup on the multicast state table using the flow tuple information for the content packet or by virtually re-inserting the multi-delivery header into the packet for the purpose of determining routing decision(s) for the packet; the multi-delivery header is not included in the packet upon forwarding, but rather can be used to determine routing for the packet. Continuing to 550, the operations can include the routing node replicating the content packet, if needed based on the stored routing decision(s) for the IP flow.

The operations can continue to 552, at which the routing node transmits the content packet(s) to a next hop according to the stored routing decision(s). Following the transmitting, the operations can return to 502 such that the operations can be repeated for any additional content packets received by the routing node.

Recalling the operations at 528, based on a determination at 528 that the content packet is to be routed along diverging paths, the operations can continue to 554 as illustrated in FIG. 5D. At 554, the operations can include the routing node determining the number of diverging paths for routing the content packet by identifying the number of different routing nodes to which the content packet is to be transmitted.

At 556, the operations can include the routing node identifying the recipient content node(s) to which the content packet is to be delivered for each path (e.g., from 514). At 558, the operations can include the routing node performing content packet replication to create a number of copies of the packet based on the number of diverging paths determined for the content packet. At 560, the routing node can determine whether a multi-delivery bitmap is included in the multi-delivery header. Based on a determination at 560 that a multi-delivery bitmap is included in the multi-delivery header, the operations can include the routing node performing bit resetting operations at 562 for the multi-delivery bitmap of each replicated content packet to be transmitted along each path. In at least one embodiment, the bit resetting operations can include the routing node resetting one or more bit(s) in the bitmap that do not correspond to recipient content node(s) that are to receive the replicated content packet for a given path. The operations can then continue to 566.

However, based on a determination at 560 that a multi-delivery bitmap is not included in the multi-delivery header, the operations can include the routing node performing updating operations at 564 for the multi-delivery list of each replicated content packet to be transmitted along each path. The updating operations can include the routing node updating the list of recipient content node(s) included in the multi-delivery header of a given replicated packet for a given path to identify only the recipient content node(s) that are to receive the replicated content packet for the given path. The operations can then continue to 566.

At 566, the operations can include the routing node determining whether (e.g., based on the originally received packet or any replicated content packet) it is to establish a temporary multicast state for the IP flow. Based on a determination at 566 that the routing node is to establish a temporary multicast state for the IP flow, the operations can continue to 568 at which the routing node caches the multi-delivery header for each replicated content packet and associates the routing decisions with flow tuple (e.g., 5-tuple, etc.) for the IP flow and the operations continue to 570. The association can be stored in a multicast state table maintained by the routing node. Based on a determination at 566 that the routing node is not to establish a temporary multicast state for the flow, the operations can continue 570. At 570, the routing node transmits the content packet to a next routing node, as determined from the RIB/FIB lookups as performed at 514.

Accordingly, FIGS. 5A-5D illustrate various operations that can be performed by routing nodes within communication system 100 to facilitate content delivery to multiple recipients.

Figure 6:
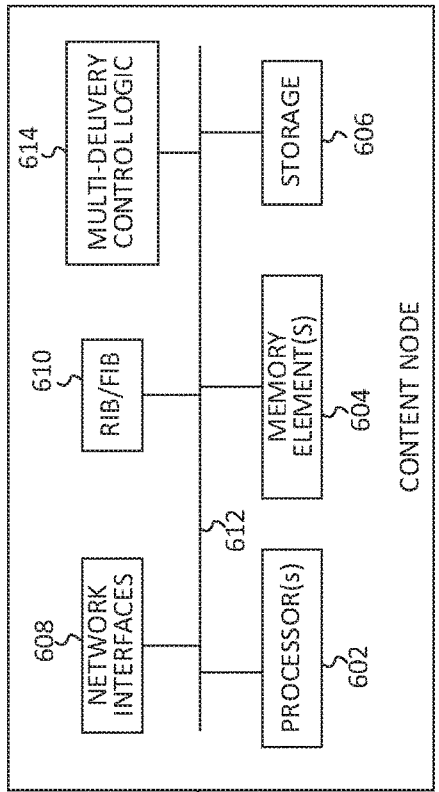
FIGS. 6-7 are simplified block diagrams illustrating example details that can be associated with the communication system.

Referring to FIG. 6, FIG. 6 is a simplified block diagram illustrating example details that can be associated with a content node 600 in accordance with at least one embodiment of communication system 100. Content node 600 is a network element that includes content communication capabilities in addition to computing and data processing capabilities in order to facilitate content delivery to multiple recipients and content reception or retrieval from another content node via an IP network (e.g., IP network 110). Recall that a parent content node can sometimes perform operations of a recipient content node and vice-versa depending on whether the content node is transmitting content to another content node (e.g., for a parent content node) or receiving content from another content node (e.g., for a recipient content node). Accordingly, example details discussed for content node 600 can be implemented for any recipient content node (e.g., recipient content nodes 102.1-102.N) and any parent content node (e.g., parent content node 106) that may be deployed in communication system 100. In at least one embodiment, content node 600 can include one or more processor(s) 602, one or more memory element(s) 604, storage 606, network interfaces 608, a Routing Information Base and/or Forwarding Information Base (RIB/FIB) 610, a bus 612 and multi-delivery control logic 614.

In at least one embodiment, processor(s) 602 is/are at least one hardware processor configured to execute various tasks, operations and/or functions for content node 600 as described herein according to software and/or instructions configured for content node 600. In at least one embodiment, memory element(s) 604 and/or storage 606 is/are configured to store data, information, software and/or instructions associated with content node 600 and/or logic configured for memory element(s) 604 and/or storage 606 (e.g., multi-delivery control logic 614 can, in various embodiments, be stored using any combination of memory element(s) 604 and/or storage 606). In at least one embodiment, bus 612 can be configured as an interface that enables one or more elements of content node 600 (e.g., processor(s) 602, memory element(s) 604, logic 614, network interfaces 608, etc.) to communicate in order to exchange information and/or data. In at least one embodiment, bus 612 may be implemented as a fast kernel-hosted interconnect, potentially using shared memory between processes (e.g., logic, etc.), which can enable efficient communication paths between the processes.

In various embodiments, network interfaces 608 enable communication between content node 600, and other network elements and/or nodes that may be present in communication system 100 (e.g., other content nodes, routing nodes, etc.) to facilitate operations discussed for various embodiments described herein. In some embodiments, network interfaces 608 can include one or more Ethernet driver(s) and/or controller(s), Fibre Channel driver(s) and/or controller(s) or other similar network interface driver(s) and/or controller(s) to enable communications for content node 600 within communication system 100. In various embodiments storage 606 and/or memory element(s) 604 can be configured to store data, information, software and/or instructions associated with content node 600 and/or logic configured for content node 600.

In various embodiments, memory element(s) 604 and/or storage 606 can be configured to store: RIB/FIB 610; any other information that may facilitate multi-delivery routing as discussed for embodiments described herein (e.g., interface information, port information; IP address information, etc.); any content that may be distributed to and/or received from another content node; logic; any other data, information, software and/or instructions as discussed for various embodiments described herein; combinations thereof or the like. Note that in some embodiments, storage can be consolidated with memory elements (or vice versa), or can overlap/exist in any other suitable manner.

In at least one embodiment, RIB/FIB 610 can be provisioned in content node 600 as a data structure that can be populated with routing protocol information (e.g., destination addresses, hop addresses, metrics, interface information, etc.), which can be manually configured and/or automatically configured via communications among other nodes (e.g., advertisements, etc.) of communication system 100.

In various embodiments, multi-delivery control logic 614 can include instructions that, when executed (e.g., by processor(s) 602) cause content node 600 to perform operations, which can include, but not be limited to: transmitting content request(s) toward one or more parent content node(s); determining whether a number of content requests for a same content have been received from multiple recipient content node(s); generating multi-delivery headers; appending packets with a multi-delivery header; receiving content from one or more parent content node(s); performing routing operations; combinations thereof and/or any other operations as discussed for various embodiments described herein.

Figure 7:
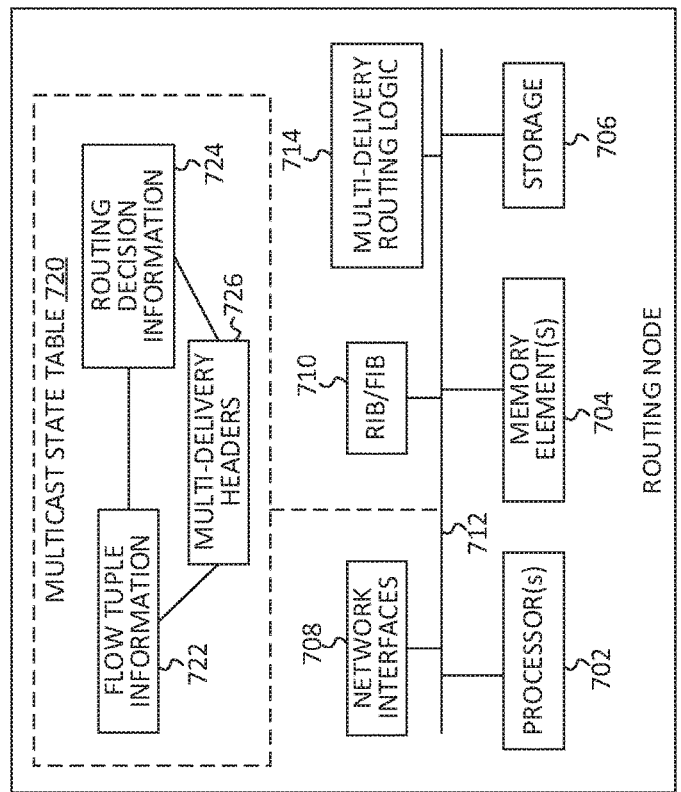

Referring to FIG. 7, FIG. 7 is a simplified block diagram illustrating example details that can be associated with a routing node 700 in accordance with at least one embodiment of communication system 100. Routing node 700 is a network element that includes content communication capabilities in addition to computing and data processing capabilities in order to facilitate content delivery to multiple recipients via an IP network (e.g., IP network 110). Accordingly, example details discussed for routing node 700 can be implemented for any routing node 104.1-104.M that may be deployed in communication system 100. In at least one embodiment, routing node 700 can include one or more processor(s) 702, one or more memory element(s) 704, storage 706, network interfaces 708, a Routing Information Base and/or Forwarding Information Base (RIB/FIB) 710, a bus 712, multi-delivery routing logic 714. In some embodiments, for example, if routing node 700 is to store multicast state(s) for one or more IP flow(s), a multicast state table 720 can be provisioned for routing node 700.

In at least one embodiment, processor(s) 702 is/are at least one hardware processor configured to execute various tasks, operations and/or functions for routing node 700 as described herein according to software and/or instructions configured for routing node 700. In at least one embodiment, memory element(s) 704 and/or storage 706 is/are configured to store data, information, software and/or instructions associated with routing node 700 and/or logic configured for memory element(s) 704 and/or storage 706 (e.g., multi-delivery routing logic 714 can, in various embodiments, be stored using any combination of memory element(s) 704 and/or storage 706). In at least one embodiment, bus 712 can be configured as an interface that enables one or more elements of routing node 700 (e.g., processor(s) 702, memory element(s) 704, logic 714, network interfaces 708, etc.) to communicate in order to exchange information and/or data. In at least one embodiment, bus 712 may be implemented as a fast kernel-hosted interconnect, potentially using shared memory between processes (e.g., logic, etc.), which can enable efficient communication paths between the processes.

In various embodiments, network interfaces 708 enable communication between routing node 700, and other network elements and/or nodes that may be present in communication system 100 (e.g., content nodes, other routing nodes, etc.) to facilitate operations discussed for various embodiments described herein. In some embodiments, network interfaces 708 can include one or more Ethernet driver(s) and/or controller(s), Fibre Channel driver(s) and/or controller(s) or other similar network interface driver(s) and/or controller(s) to enable communications for routing node 700 within communication system 100.

In various embodiments, memory element(s) 704 and/or storage 706 can be configured to store: RIB/FIB 710; any other information that may facilitate multi-delivery routing as discussed for embodiments described herein (e.g., interface information, port information, IP address information, etc.); multicast state information (e.g., for multicast state table 720, if established for one or more IP flow(s) that may be handled by routing node 700); logic; any other data, information, software and/or instructions as discussed for various embodiments described herein; combinations thereof or the like. Note that in some embodiments, storage can be consolidated with memory elements (or vice versa), or can overlap/exist in any other suitable manner.

In at least one embodiment, RIB/FIB 710 can be provisioned in routing node 700 as a data structure that can be populated with routing protocol information (e.g., destination addresses, hop addresses, metrics, interface information, etc.), which can be manually configured and/or automatically configured via communications among other nodes (e.g., advertisements, etc.) of communication system 100.

In at least one embodiment, multicast state table 720 may be provisioned for routing node 700 to enable the routing node to perform routing operations for one or more content packets of an IP flow (e.g., that do not include a multi-delivery header). In one embodiment, multicast state table 720 can include flow tuple information 722 mapped or associated to routing decision information 724 and multi-delivery headers 726 for one or more IP flows. In various embodiments, multicast state table 720 can be separate from other elements (e.g., RIB/FIB 710, logic, etc.) of routing node 700 or could be integrated with one or more of the elements based on particular needs and implementations.

In various embodiments, multi-delivery routing logic 714 can include instructions that, when executed (e.g., by processor(s) 702) cause routing node 700 to perform operations, which can include, but not be limited to: receiving content packets; performing RIB/FIB lookups based on source and/or destination addresses in an IP header of content packets; performing RIB/FIB lookups based on multi-delivery identifiers included in multi-delivery headers; analyzing portions (e.g., a list multi-delivery recipient content nodes and/or a multi-delivery bitmap) of multi-delivery headers; updating the destination address of an IP header, if needed; updating or removing multi-delivery headers; performing content packet replication; performing packet routing based on RIB/FIB lookups; establishing, updating, maintaining and/or matching temporary multicast states using flow tuple information for one or more IP flows (e.g., via multicast state table 720); combinations thereof and/or any other operations as discussed for various embodiments described herein.

In regards to the internal structure associated with communication system 100, appropriate software, hardware and/or algorithms are being provisioned for content nodes and routing nodes within communication system 100 in order to facilitate operations as discussed for various embodiments described herein to facilitate multi-delivery operations in a network environment.

In various example implementations, content nodes and routing nodes discussed for various embodiments described herein can encompass network appliances, routers, servers, switches, gateways, bridges, loadbalancers, firewalls, processors, modules, radio receivers/transmitters or any other suitable device, component, element, or object operable to exchange information that facilitates or otherwise helps to facilitate various multi-delivery operations as described for various embodiments discussed herein in a network environment (e.g., for networks such as those illustrated in FIG. 1A). In various embodiments, one or more of content nodes and routing nodes discussed herein can include software (or reciprocating software) that can coordinate in order to achieve operations associated with providing content delivery to multiple recipients in a network environment as discussed herein and may include any suitable algorithms, hardware, software, components, modules, logic, clients, interfaces, and/or objects that facilitate the operations thereof. This may be inclusive of appropriate algorithms, communication protocols, interfaces and/or standards, proprietary and/or non-proprietary that allow for the effective exchange of data or information.

In various embodiments, content nodes and routing nodes discussed herein may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, and/or object where appropriate and based on particular needs. Any of the memory items discussed herein should be construed as being encompassed within the broad term 'memory element'. Information being tracked or sent to one or more of content nodes and routing nodes discussed herein could be provided in any database, table, register, control list, cache, storage and/or storage structure: all of which can be referenced at any suitable timeframe. Any such storage options may also be included within the broad term 'memory element' as used herein. Any of potential processing elements, controllers, managers, logic and/or machines described herein can be construed as being encompassed within the broad term 'processor'. In various embodiments, content nodes and routing nodes discussed herein can also include suitable interfaces for receiving, transmitting, and/or otherwise communicating data or information in a network environment.

Note that in certain example implementations, operations as outlined herein to facilitate content delivery to multiple recipients in a network environment may be implemented by logic encoded in one or more tangible media, which may be inclusive of non-transitory tangible media and/or non-transitory computer readable storage media (e.g., embedded logic provided in an ASIC, in digital signal processing (DSP) instructions, software [potentially inclusive of object code and source code] to be executed by a processor, or other similar machine, etc.). In some of these instances, a memory element and/or storage [as shown in FIGS. 6-7] can store data, software, code, instructions (e.g., processor instructions), logic, parameters, combinations thereof or the like used for operations described herein. This includes memory elements and/or storage being able to store data, software, code, instructions (e.g., processor instructions), logic, parameters, combinations thereof or the like that are executed to carry out operations described herein. A processor (e.g., a hardware processor) can execute any type of instructions associated with data to achieve the operations detailed herein. In one example, a processor [as shown in FIGS. 6-7] can transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and/or one or more the elements identified herein could be some type of a programmable processor, programmable digital logic (e.g., a field programmable gate array (FPGA), a DSP processor, an EPROM, a controller, an electrically erasable PROM (EEPROM) or an ASIC that includes digital logic, software, code, electronic instructions, or any suitable combination thereof.

Note that in this Specification, references to various features (e.g., elements, structures, nodes, modules, components, logic, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein this Specification, can be inclusive of an executable file comprising instructions that can be understood and processed on a computer, processor, machine, compute node combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the communication system 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of' and 'one or more of' can be represented using the'(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 100 may be applicable to other exchanges or routing protocols, interfaces and/or communications standards, proprietary and/or non-proprietary. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (1) does not intend any of the appended claims to invoke paragraph (f) of 35 U.S.C. Section 112 as it exists on the date of the filing hereof unless the words "means for" or "step for" are specifically used in the particular claims; and (2) does not intend, by any statement in the specification, to limit this disclosure in any way that is not otherwise reflected in the appended claims.

What is claimed is:

1. A method comprising:
    determining, by a parent content node of an information centric content network, that a plurality of recipient content nodes are to receive a same content based on requests for the same content obtained by the parent content node from the plurality of recipient content nodes, wherein the determining is based on one of a threshold number of the requests for the same content being obtained from the plurality of recipient content nodes or the requests for the same content from the plurality of recipient content nodes being obtained within a threshold amount of time;
    generating, by the parent content node, based on a determination that the same content is available at the parent content node, a multi-delivery header comprising a plurality of identifiers associated with the plurality of recipient content nodes;
    appending, by the parent content node, the multi-delivery header to one or more packets of a flow including at least a portion of the same content; and
    transmitting, by the parent content node, the one or more packets of the flow toward the plurality of recipient content nodes.

2. The method of claim 1, wherein each identifier of the plurality of identifiers indicates a particular recipient content node of the plurality of recipient content nodes that is to receive the same content.

3. The method of claim 1, wherein the multi-delivery header further comprises a bitmap and wherein each bit in the bitmap corresponds to a particular recipient content node of the plurality of recipient content nodes that is to receive the same content.

4. The method of claim 1, wherein the plurality of identifiers comprise:
    a plurality of User Datagram Protocol (UDP) port values, wherein each UDP port value corresponds to a particular recipient content node of the plurality of recipient content nodes that is to receive the same content.

5. The method of claim 1, wherein the plurality of identifiers comprise:
    a plurality of Internet Protocol version 6 (IPv6) addresses, wherein each IPv6 address corresponds to a particular recipient content node of the plurality of recipient content nodes that is to receive the same content.

6. The method of claim 1, wherein the multi-delivery header further comprises a segment routing header prologue portion.

7. The method of claim 6, wherein the segment routing header prologue portion comprises one or more bits that indicate whether a routing node is to establish or update a temporary multicast state for the flow.

8. One or more non-transitory computer readable storage media encoded with instructions that, when executed by a processor, cause the processor to perform operations, comprising:
    determining, by a parent content node of an information centric content network that a plurality of recipient content nodes are to receive a same content based on requests for the same content obtained by the parent content node from the plurality of recipient content nodes, wherein the determining is based on one of a threshold number of requests for the same content being obtained from the plurality of recipient content nodes or the requests for the same content obtained from the plurality of recipient content nodes being obtained within a threshold amount of time;
    generating, at the parent content node, based on a determination that the same content is available at the parent content node, a multi-delivery header comprising a plurality of identifiers associated with the plurality of recipient content nodes;
    appending, by the parent content node, the multi-delivery header to one or more packets of a flow, including at least a portion of with the same content; and
    transmitting, by the parent content node, the one or more packets for the flow toward the plurality of recipient content nodes.

9. The media of claim 8, wherein each identifier of the plurality of identifiers indicates a particular recipient content node of the plurality of recipient content nodes that is to receive the same content.

10. The media of claim 8, wherein the multi-delivery header further comprises a bitmap and wherein each bit in the bitmap corresponds to a particular recipient content node of the plurality of recipient content nodes that is to receive the same content.

11. The media of claim 8, wherein the plurality of identifiers comprise:

a plurality of User Datagram Protocol (UDP) port values, wherein each UDP port value corresponds to a particular recipient content node of the plurality of recipient content nodes that is to receive the same content.

12. The media of claim 8, wherein the plurality of identifiers comprise:

a plurality of Internet Protocol version 6 (IPv6) addresses, wherein each IPv6 address corresponds to a particular recipient content node of the plurality of recipient content nodes that is to receive the same content.

13. The media of claim 8, wherein the multi-delivery header further comprises a segment routing header prologue portion.

14. The media of claim 13, wherein the segment routing header prologue portion comprises one or more bits that indicate whether a routing node is to establish or update a temporary multicast state for the flow.

15. A system comprising:

at least one memory element for storing data; and at least one processor for executing instructions associated with the data, wherein the executing causes the system to perform operations, comprising:

determining, by a parent content node of an information centric content network, that a plurality of recipient content nodes are to receive a same content based on requests for the same content obtained by the parent content node from the plurality of recipient content nodes, wherein the determining is based on one of a threshold number of requests for the same content being obtained from the plurality of recipient content nodes or the requests for the same content from the plurality of recipient content nodes being obtained within a threshold amount of time;

generating, by the parent content node, based on a determination that the same content is available at the parent content node, a multi-delivery header comprising a plurality of identifiers associated with the plurality of recipient content nodes;

appending, by the parent content node, the multi-delivery header to one or more packets of a flow including at least a portion of the same content; and transmitting, by the parent content node, the one or more packets for the flow toward the plurality of recipient content nodes.

16. The system of claim 15, wherein each identifier of the plurality of identifiers indicates a particular recipient content node of the plurality of recipient content nodes that is to receive the same content.

17. The system of claim 15, wherein the multi-delivery header further comprises a bitmap and wherein each bit in the bitmap corresponds to a particular recipient content node of the plurality of recipient content nodes that is to receive the same content.

18. The system of claim 15, wherein the plurality of identifiers comprise:

a plurality of User Datagram Protocol (UDP) port values, wherein each UDP port value corresponds to a particular recipient content node of the plurality of recipient content nodes that is to receive the same content.

19. The system of claim 15, wherein the plurality of identifiers comprise:

a plurality of Internet Protocol version 6 (IPv6) addresses, wherein each IPv6 address corresponds to a particular recipient content node of the plurality of recipient content nodes that is to receive the same content.

20. The system of claim 15, wherein the multi-delivery header further comprises a segment routing header prologue portion comprising one or more bits that indicate whether a routing node is to establish or update a temporary multicast state for the flow.

\* \* \* \* \*